(12) United States Patent
Chardon et al.

(10) Patent No.: US 8,918,544 B2
(45) Date of Patent: Dec. 23, 2014

(54) APPARATUS AND METHOD FOR CONFIGURATION AND OPERATION OF A REMOTE-CONTROL SYSTEM

(75) Inventors: Jean-Michel Chardon, Toronto (CA); Eric Raeber, Redwood City, CA (US)

(73) Assignee: Logitech Europe S.A., Lausanne (CH)

( * ) Notice: Subject to any disclaimer, the term of this patent is extended or adjusted under 35 U.S.C. 154(b) by 429 days.

(21) Appl. No.: 13/077,750

(22) Filed: Mar. 31, 2011

(65) Prior Publication Data

US 2012/0249890 A1   Oct. 4, 2012

(51) Int. Cl.
  G06F 3/00    (2006.01)
  G06F 13/38   (2006.01)
  H04N 5/765   (2006.01)
  H04N 5/44    (2011.01)

(52) U.S. Cl.
  CPC .............. *H04N 5/44* (2013.01); *H04N 5/765* (2013.01); *H04N 2005/4407* (2013.01)
  USPC .................................... 710/8; 710/15; 710/62

(58) Field of Classification Search
  None
  See application file for complete search history.

(56) References Cited

U.S. PATENT DOCUMENTS

| | | |
|---|---|---|
| 3,990,012 A | 11/1976 | Karnes |
| 4,174,517 A | 11/1979 | Mandel |
| 4,394,691 A | 7/1983 | Amano et al. |
| 4,488,179 A | 12/1984 | Kruger et al. |
| 4,566,034 A | 1/1986 | Harger et al. |
| 4,626,848 A | 12/1986 | Ehlers |
| 4,774,511 A | 9/1988 | Rumbolt et al. |
| 4,837,627 A | 6/1989 | Mengel |
| 4,918,439 A | 4/1990 | Wozniak et al. |
| 4,959,810 A | 9/1990 | Darbee et al. |
| 5,109,222 A | 4/1992 | Welty |
| 5,140,326 A | 8/1992 | Bacrania et al. |
| 5,161,023 A | 11/1992 | Keenan |
| 5,177,461 A | 1/1993 | Budzyna et al. |
| 5,228,077 A | 7/1993 | Darbee |
| 5,255,313 A | 10/1993 | Darbee |
| 5,272,418 A | 12/1993 | Howe et al. |
| 5,374,999 A | 12/1994 | Chuang et al. |
| 5,410,326 A | 4/1995 | Goldstein |
| 5,414,426 A | 5/1995 | O'Donnell et al. |

(Continued)

FOREIGN PATENT DOCUMENTS

| | | |
|---|---|---|
| CN | 1399444 A | 2/2003 |
| CN | 1434422 A | 8/2003 |

(Continued)

OTHER PUBLICATIONS

Ciarcia, S., "Build a Trainable Infrared Master Controller," *Byte*, 12(3):113-123.

(Continued)

*Primary Examiner* — Zachary K Huson
(74) *Attorney, Agent, or Firm* — Kilpatrick Townsend & Stockton LLP

(57) ABSTRACT

A method for configuring a remote-control system includes querying via a bus a High Definition Multi-Media Interface (HDMI) display for an Extended Display Identification Data (EDID) for the HDMI display; receiving via the bus from the HDMI display the EDID for the HDMI display; and storing via a processor in a memory the EDID and a link between the EDID of the HDMI display a set of command codes configured for controlling the HDMI display.

23 Claims, 7 Drawing Sheets

(56) References Cited

U.S. PATENT DOCUMENTS

| | | |
|---|---|---|
| 5,414,761 A | 5/1995 | Darbee |
| 5,422,783 A | 6/1995 | Darbee |
| 5,481,251 A | 1/1996 | Buys et al. |
| 5,481,256 A | 1/1996 | Darbee et al. |
| 5,515,052 A | 5/1996 | Darbee |
| 5,537,463 A | 7/1996 | Escobosa et al. |
| 5,552,917 A | 9/1996 | Darbee et al. |
| 5,568,367 A | 10/1996 | Park |
| 5,579,221 A | 11/1996 | Mun |
| 5,614,906 A | 3/1997 | Hayes et al. |
| 5,619,196 A | 4/1997 | Escobosa |
| 5,629,868 A | 5/1997 | Tessier et al. |
| 5,638,050 A | 6/1997 | Sacca et al. |
| 5,671,267 A | 9/1997 | August et al. |
| 5,677,711 A | 10/1997 | Kuo |
| 5,686,891 A | 11/1997 | Sacca et al. |
| 5,689,353 A | 11/1997 | Darbee et al. |
| 5,778,256 A | 7/1998 | Darbee |
| 5,907,322 A | 5/1999 | Kelly et al. |
| 5,943,228 A | 8/1999 | Kim |
| 5,949,351 A | 9/1999 | Hahm |
| 5,953,144 A | 9/1999 | Darbee et al. |
| 5,959,751 A | 9/1999 | Darbee et al. |
| 5,963,145 A | 10/1999 | Escobosa |
| 6,002,450 A | 12/1999 | Darbee et al. |
| 6,014,092 A | 1/2000 | Darbee et al. |
| 6,097,309 A | 8/2000 | Hayes et al. |
| 6,097,441 A | 8/2000 | Allport |
| 6,104,334 A | 8/2000 | Allport |
| 6,130,625 A | 10/2000 | Harvey |
| 6,130,726 A | 10/2000 | Darbee et al. |
| 6,133,847 A | 10/2000 | Yang |
| 6,147,677 A | 11/2000 | Escobosa et al. |
| 6,154,204 A | 11/2000 | Thompson et al. |
| 6,157,319 A | 12/2000 | Johns et al. |
| 6,169,451 B1 | 1/2001 | Kim |
| 6,173,330 B1 | 1/2001 | Guo et al. |
| 6,177,931 B1 | 1/2001 | Alexander et al. |
| 6,195,033 B1 | 2/2001 | Darbee et al. |
| 6,211,870 B1 | 4/2001 | Foster |
| 6,223,348 B1 | 4/2001 | Hayes et al. |
| 6,225,938 B1 | 5/2001 | Hayes et al. |
| 6,243,035 B1 | 6/2001 | Walter et al. |
| 6,255,961 B1 | 7/2001 | Van Ryzin et al. |
| 6,271,831 B1 | 8/2001 | Escobosa et al. |
| 6,275,268 B1 | 8/2001 | Ellis et al. |
| 6,278,499 B1 | 8/2001 | Darbee |
| 6,288,799 B1 | 9/2001 | Sekiguchi |
| 6,330,091 B1 | 12/2001 | Escobosa et al. |
| 6,374,404 B1 | 4/2002 | Brotz et al. |
| 6,496,135 B1 | 12/2002 | Darbee |
| 6,522,262 B1 | 2/2003 | Hayes et al. |
| 6,538,556 B1 | 3/2003 | Kawajiri |
| 6,563,430 B1 | 5/2003 | Kemink et al. |
| 6,567,011 B1 | 5/2003 | Young et al. |
| 6,567,984 B1 | 5/2003 | Allport |
| 6,587,067 B2 | 7/2003 | Darbee et al. |
| 6,628,340 B1 | 9/2003 | Graczyk et al. |
| 6,629,077 B1 | 9/2003 | Arling et al. |
| 6,640,144 B1 | 10/2003 | Huang et al. |
| 6,642,852 B2 | 11/2003 | Dresti et al. |
| 6,650,247 B1 | 11/2003 | Hayes |
| 6,657,679 B2 | 12/2003 | Hayes et al. |
| 6,690,290 B2 | 2/2004 | Young et al. |
| 6,701,091 B2 | 3/2004 | Escobosa et al. |
| 6,720,904 B1 | 4/2004 | Darbee |
| 6,722,984 B1 | 4/2004 | Sweeney, Jr. et al. |
| 6,724,339 B2 | 4/2004 | Conway et al. |
| 6,747,591 B2 | 6/2004 | Lilleness et al. |
| 6,748,248 B1 | 6/2004 | Pan et al. |
| 6,781,518 B1 | 8/2004 | Hayes et al. |
| 6,781,638 B1 | 8/2004 | Hayes |
| 6,784,804 B1 | 8/2004 | Hayes et al. |
| 6,785,579 B2 | 8/2004 | Huang et al. |
| 6,788,241 B2 | 9/2004 | Arling et al. |
| 6,826,370 B2 | 11/2004 | Escobosa et al. |
| 6,829,512 B2 | 12/2004 | Huang et al. |
| 6,847,101 B2 | 1/2005 | Ejelstad et al. |
| 6,859,197 B2 | 2/2005 | Klein et al. |
| 6,870,463 B2 | 3/2005 | Dresti et al. |
| 6,882,729 B2 | 4/2005 | Arling et al. |
| 6,885,952 B1 | 4/2005 | Hayes |
| 6,917,302 B2 | 7/2005 | Lilleness et al. |
| 6,933,833 B1 | 8/2005 | Darbee |
| 6,938,101 B2 | 8/2005 | Hayes et al. |
| 6,946,988 B2 | 9/2005 | Edwards et al. |
| 6,947,101 B2 | 9/2005 | Arling |
| 6,968,570 B2 | 11/2005 | Hayes et al. |
| 7,005,979 B2 | 2/2006 | Haughawout et al. |
| 7,010,805 B2 | 3/2006 | Hayes et al. |
| 7,013,434 B2 | 3/2006 | Masters et al. |
| RE39,059 E | 4/2006 | Foster |
| 7,046,161 B2 | 5/2006 | Hayes |
| 7,079,113 B1 | 7/2006 | Hayes et al. |
| 7,091,898 B2 | 8/2006 | Arling et al. |
| 7,093,003 B2 | 8/2006 | Yuh et al. |
| 7,102,688 B2 | 9/2006 | Hayes et al. |
| 7,119,710 B2 | 10/2006 | Hayes et al. |
| 7,126,468 B2 | 10/2006 | Arling et al. |
| 7,129,995 B2 | 10/2006 | Arling |
| 7,136,709 B2 | 11/2006 | Arling et al. |
| 7,142,127 B2 | 11/2006 | Hayes et al. |
| 7,142,934 B2 | 11/2006 | Janik |
| 7,142,935 B2 | 11/2006 | Janik |
| 7,143,214 B2 | 11/2006 | Hayes et al. |
| 7,154,428 B2 | 12/2006 | De Clercq et al. |
| 7,155,305 B2 | 12/2006 | Hayes et al. |
| 7,161,524 B2 | 1/2007 | Nguyen |
| 7,167,765 B2 | 1/2007 | Janik |
| 7,167,913 B2 | 1/2007 | Chanmbers |
| 7,193,661 B2 | 3/2007 | Dresti et al. |
| 7,200,357 B2 | 4/2007 | Janik et al. |
| 7,209,116 B2 | 4/2007 | Gates et al. |
| 7,218,243 B2 | 5/2007 | Hayes et al. |
| 7,221,306 B2 | 5/2007 | Young |
| RE39,716 E | 7/2007 | Huang et al. |
| 7,253,765 B2 | 8/2007 | Edwards et al. |
| 7,254,777 B2 | 8/2007 | Hayes et al. |
| 7,266,701 B2 | 9/2007 | Hayes et al. |
| 7,266,777 B2 | 9/2007 | Scott et al. |
| 7,268,694 B2 | 9/2007 | Hayes et al. |
| 7,274,303 B2 | 9/2007 | Dresti et al. |
| 7,281,262 B2 | 10/2007 | Hayes et al. |
| 7,319,409 B2 | 1/2008 | Hayes et al. |
| 7,319,426 B2 | 1/2008 | Garfio |
| 7,436,319 B1 | 10/2008 | Harris et al. |
| 7,436,346 B2 | 10/2008 | Walter et al. |
| 7,877,328 B2 | 1/2011 | Tanaka |
| 7,944,370 B1 | 5/2011 | Harris et al. |
| 8,031,270 B1 * | 10/2011 | Wisniewski et al. .......... 348/734 |
| 8,054,294 B2 | 11/2011 | Sakai et al. |
| 8,117,590 B2 | 2/2012 | Kataoka |
| 8,281,047 B2 * | 10/2012 | Yoshida et al. .................... 710/9 |
| 2002/0046083 A1 | 4/2002 | Ondeck |
| 2002/0056084 A1 | 5/2002 | Harris et al. |
| 2002/0190956 A1 | 12/2002 | Klein et al. |
| 2003/0046579 A1 | 3/2003 | Hayes et al. |
| 2003/0048295 A1 | 3/2003 | Lilleness et al. |
| 2003/0095156 A1 | 5/2003 | Klein et al. |
| 2003/0103088 A1 | 6/2003 | Dresti et al. |
| 2003/0117427 A1 | 6/2003 | Haughawout et al. |
| 2003/0151538 A1 | 8/2003 | Escobosa et al. |
| 2003/0164773 A1 | 9/2003 | Young et al. |
| 2003/0164787 A1 | 9/2003 | Dresti |
| 2003/0189509 A1 | 10/2003 | Hayes et al. |
| 2003/0193519 A1 | 10/2003 | Hayes et al. |
| 2003/0233664 A1 | 12/2003 | Huang et al. |
| 2004/0046677 A1 | 3/2004 | Dresti |
| 2004/0056789 A1 | 3/2004 | Arling et al. |
| 2004/0056984 A1 | 3/2004 | Hayes et al. |
| 2004/0070491 A1 | 4/2004 | Huang et al. |
| 2004/0093096 A1 | 5/2004 | Huang et al. |
| 2004/0117632 A1 | 6/2004 | Arling et al. |
| 2004/0136726 A1 | 7/2004 | Escobosa et al. |

(56) References Cited

U.S. PATENT DOCUMENTS

| | | |
|---|---|---|
| 2004/0169590 A1 | 9/2004 | Haughawout et al. |
| 2004/0169598 A1 | 9/2004 | Arling et al. |
| 2004/0189508 A1 | 9/2004 | Nguyen |
| 2004/0189509 A1 | 9/2004 | Lilleness et al. |
| 2004/0210933 A1 | 10/2004 | Dresti |
| 2004/0246165 A1 | 12/2004 | Conway et al. |
| 2004/0263349 A1 | 12/2004 | Haughawout et al. |
| 2004/0266419 A1 | 12/2004 | Arling et al. |
| 2004/0268391 A1 | 12/2004 | Clercq et al. |
| 2005/0024226 A1 | 2/2005 | Hayes et al. |
| 2005/0030196 A1 | 2/2005 | Harris et al. |
| 2005/0052423 A1 | 3/2005 | Harris et al. |
| 2005/0055716 A1 | 3/2005 | Louie et al. |
| 2005/0062614 A1 | 3/2005 | Young |
| 2005/0062636 A1 | 3/2005 | Conway et al. |
| 2005/0066370 A1 | 3/2005 | Alvarado |
| 2005/0073914 A1 | 4/2005 | Yabe |
| 2005/0078087 A1 | 4/2005 | Gates et al. |
| 2005/0080496 A1 | 4/2005 | Hayes et al. |
| 2005/0088315 A1 | 4/2005 | Klein et al. |
| 2005/0094610 A1 | 5/2005 | De Clerq et al. |
| 2005/0096753 A1 | 5/2005 | Arling et al. |
| 2005/0097618 A1 | 5/2005 | Arling et al. |
| 2005/0107966 A1 | 5/2005 | Hayes |
| 2005/0116930 A1 | 6/2005 | Gates |
| 2005/0134578 A1 | 6/2005 | Chambers et al. |
| 2005/0159823 A1 | 7/2005 | Hayes et al. |
| 2005/0162282 A1 | 7/2005 | Dresti |
| 2005/0179559 A1 | 8/2005 | Edwards et al. |
| 2005/0183104 A1 | 8/2005 | Edwards et al. |
| 2005/0195979 A1 | 9/2005 | Arling et al. |
| 2005/0200598 A1 | 9/2005 | Hayes et al. |
| 2005/0210101 A1 | 9/2005 | Janik |
| 2005/0216606 A1 | 9/2005 | Hayes et al. |
| 2005/0216843 A1 | 9/2005 | Masters et al. |
| 2005/0231649 A1 | 10/2005 | Arling |
| 2005/0258806 A1 | 11/2005 | Janik et al. |
| 2005/0280743 A1 | 12/2005 | Dresti et al. |
| 2005/0283814 A1 | 12/2005 | Scott et al. |
| 2005/0285750 A1 | 12/2005 | Hayes et al. |
| 2006/0007306 A1 | 1/2006 | Masters et al. |
| 2006/0012488 A1 | 1/2006 | Hilbrink et al. |
| 2006/0031400 A1 | 2/2006 | Yuh et al. |
| 2006/0031437 A1 | 2/2006 | Chambers |
| 2006/0031549 A1 | 2/2006 | Janik et al. |
| 2006/0031550 A1 | 2/2006 | Janik et al. |
| 2006/0050142 A1 | 3/2006 | Scott et al. |
| 2006/0055554 A1 | 3/2006 | Hayes et al. |
| 2006/0101498 A1 | 5/2006 | Arling et al. |
| 2006/0125800 A1 | 6/2006 | Janik |
| 2006/0132458 A1 | 6/2006 | Garfio et al. |
| 2006/0143572 A1 | 6/2006 | Scott et al. |
| 2006/0150120 A1 | 7/2006 | Dresti et al. |
| 2006/0161865 A1 | 7/2006 | Scott et al. |
| 2006/0194549 A1 | 8/2006 | Janik et al. |
| 2006/0200538 A1 | 9/2006 | Yuh et al. |
| 2006/0259183 A1 | 11/2006 | Hayes et al. |
| 2006/0259184 A1 | 11/2006 | Hayes et al. |
| 2006/0259864 A1 | 11/2006 | Klein et al. |
| 2006/0262002 A1 | 11/2006 | Nguyen |
| 2006/0283697 A1 | 12/2006 | Garfio |
| 2006/0288300 A1 | 12/2006 | Chambers et al. |
| 2006/0294217 A1 | 12/2006 | Chambers |
| 2007/0052547 A1 | 3/2007 | Haughawout et al. |
| 2007/0061027 A1 | 3/2007 | Janik |
| 2007/0061028 A1 | 3/2007 | Janik |
| 2007/0061029 A1 | 3/2007 | Janik |
| 2007/0063860 A1 | 3/2007 | Escobosa et al. |
| 2007/0073958 A1 | 3/2007 | Kalayjian |
| 2007/0077784 A1 | 4/2007 | Kalayjian et al. |
| 2007/0097275 A1 | 5/2007 | Dresti et al. |
| 2007/0136693 A1 | 6/2007 | Lilleness et al. |
| 2007/0156739 A1 | 7/2007 | Black et al. |
| 2007/0178830 A1 | 8/2007 | Janik et al. |
| 2007/0206949 A1 | 9/2007 | Mortensen |
| 2007/0225828 A1 | 9/2007 | Huang et al. |
| 2007/0233740 A1 | 10/2007 | Nichols et al. |
| 2007/0258595 A1 | 11/2007 | Choy |
| 2007/0271267 A1 | 11/2007 | Lim et al. |
| 2007/0279244 A1 | 12/2007 | Haughawout et al. |
| 2007/0296552 A1 | 12/2007 | Huang et al. |
| 2008/0005764 A1 | 1/2008 | Arling et al. |
| 2008/0016467 A1 | 1/2008 | Chambers et al. |
| 2008/0016468 A1 | 1/2008 | Chambers et al. |
| 2008/0042982 A1 | 2/2008 | Gates et al. |
| 2008/0184196 A1 | 7/2008 | Kataoka |
| 2008/0243698 A1 | 10/2008 | Tanaka |
| 2008/0314232 A1 | 12/2008 | Hansson et al. |
| 2009/0300580 A1 | 12/2009 | Heyhoe et al. |
| 2010/0005503 A1 | 1/2010 | Kaylor et al. |
| 2010/0169414 A1 | 7/2010 | Pavot et al. |
| 2012/0036538 A1 | 2/2012 | Kudelski et al. |
| 2012/0128334 A1 | 5/2012 | Cheok et al. |
| 2012/0274863 A1 | 11/2012 | Chardon et al. |

FOREIGN PATENT DOCUMENTS

| | | |
|---|---|---|
| EP | 103 438 A1 | 3/1984 |
| EP | 398 550 A2 | 11/1990 |
| EP | 1014577 A1 | 6/2000 |
| GB | 2081948 A | 2/1982 |
| GB | 2175724 A | 12/1986 |
| JP | 2002058079 A | 2/2002 |
| JP | 2002271871 A | 9/2002 |
| JP | 2003087881 A | 3/2003 |
| WO | WO 01/69567 A2 | 9/1991 |
| WO | WO 99/34564 A1 | 7/1999 |
| WO | WO 00/34851 A1 | 6/2000 |
| WO | WO 03/045107 A1 | 5/2003 |
| WO | WO 03/060804 A1 | 7/2003 |
| WO | WO 2005/000003 A2 | 1/2005 |

OTHER PUBLICATIONS

Ciarcia, S., *The Best of Ciarcia's Circuit Cellar*, pp. 345-354 (1987).
Konstan, J. A., "State problems in programming human-controlled devices," *Digest of Tech. Papers of Int. Conf. on Consumer Electronics (ICCE)*, pp. 122-123 (1994).
Radio Shack, *Universal Remote Control Owners Manual*, pp. 1-19, (1987).
"ProntoEdit User Manual"; 2002, http://www.pronto.philips.com/index.cfm?id=241, 85 pages.
"Pronto Review"; www.remotecentral.com/pronto/index.html, 3 pages, 2005.
Press Release: "Philips Revolutionizes Home Theatre Control"; 1998, 3 pages.
Pronto link to downloadable files for components from different manufacturers; http://www.remotecentral.com/files/index.html, 3 pages, 2005.
U.S. Appl. No. 12/731,086, filed Mar. 24, 2010.
U.S. Appl. No. 13/284,668, filed Oct. 28, 2011.
U.S. Appl. No. 13/284,775, filed Oct. 28, 2011.
U.S. Appl. No. 11/267,528, filed Nov. 3, 2005.
U.S. Appl. No. 11/199,922, filed Aug. 8, 2005.
Office Action issued on U.S. Appl. No. 13/284,668 dated Apr. 21, 2014.

* cited by examiner

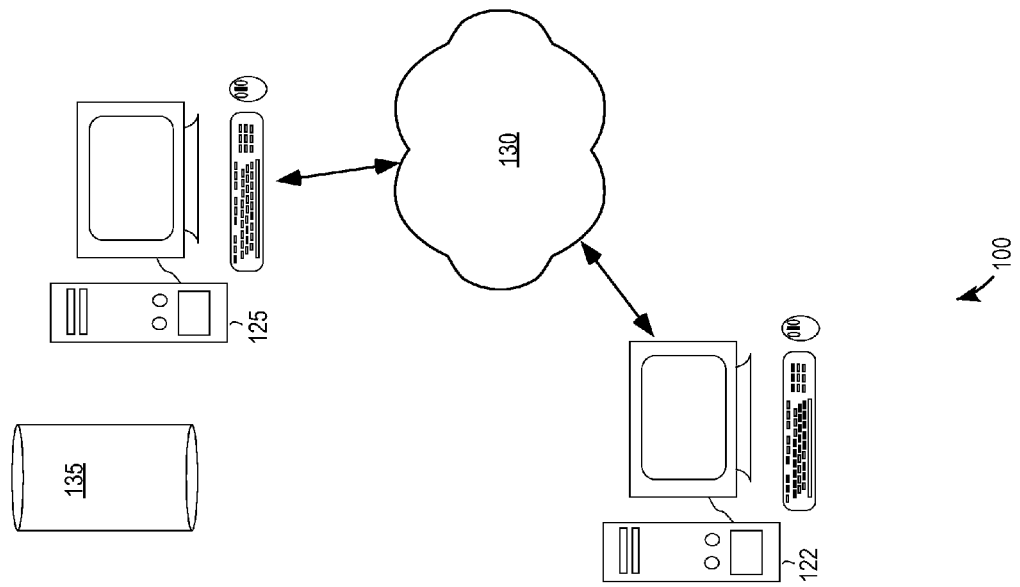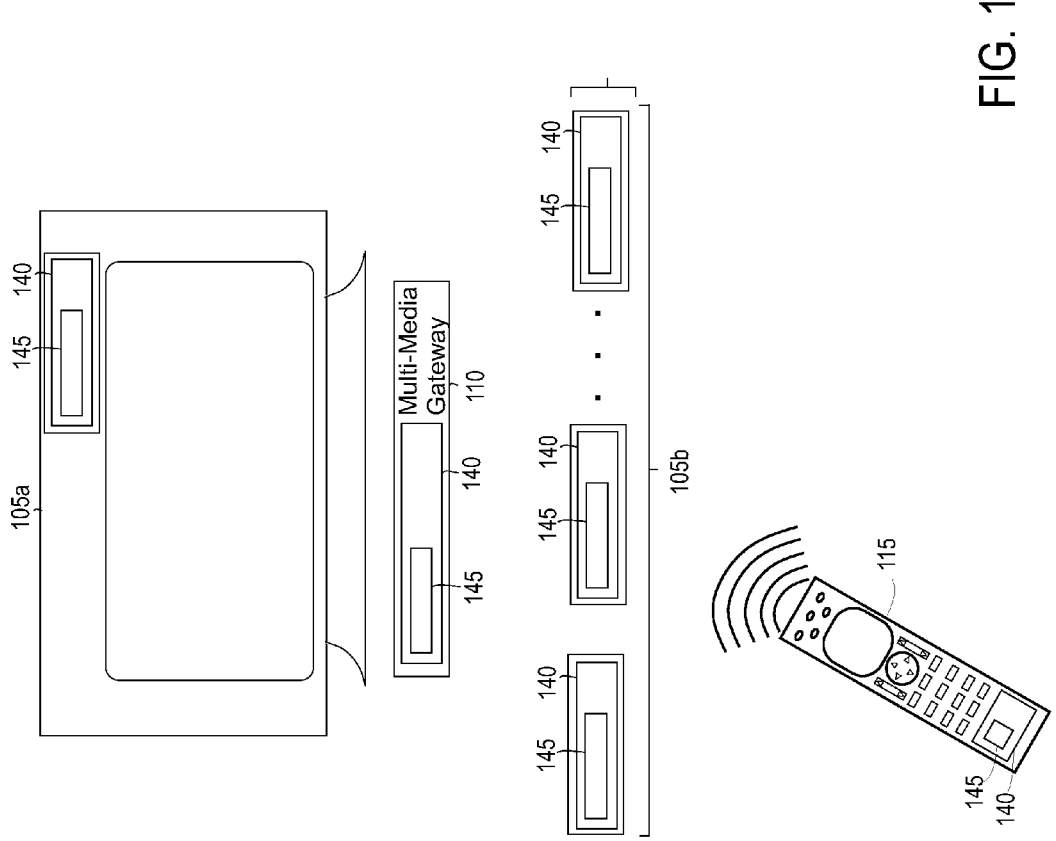
FIG. 1

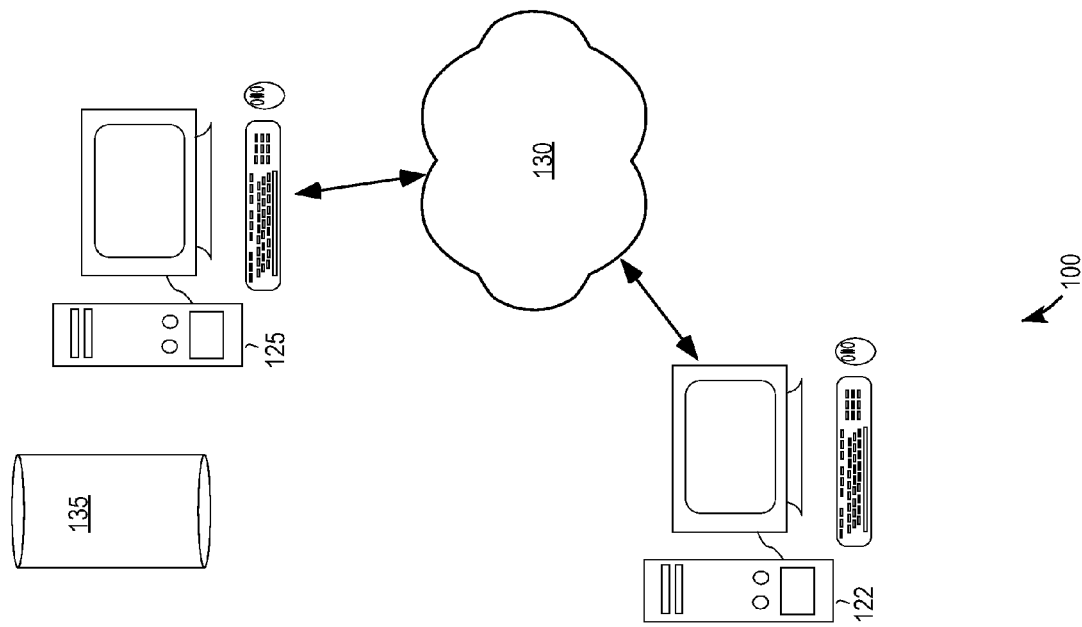
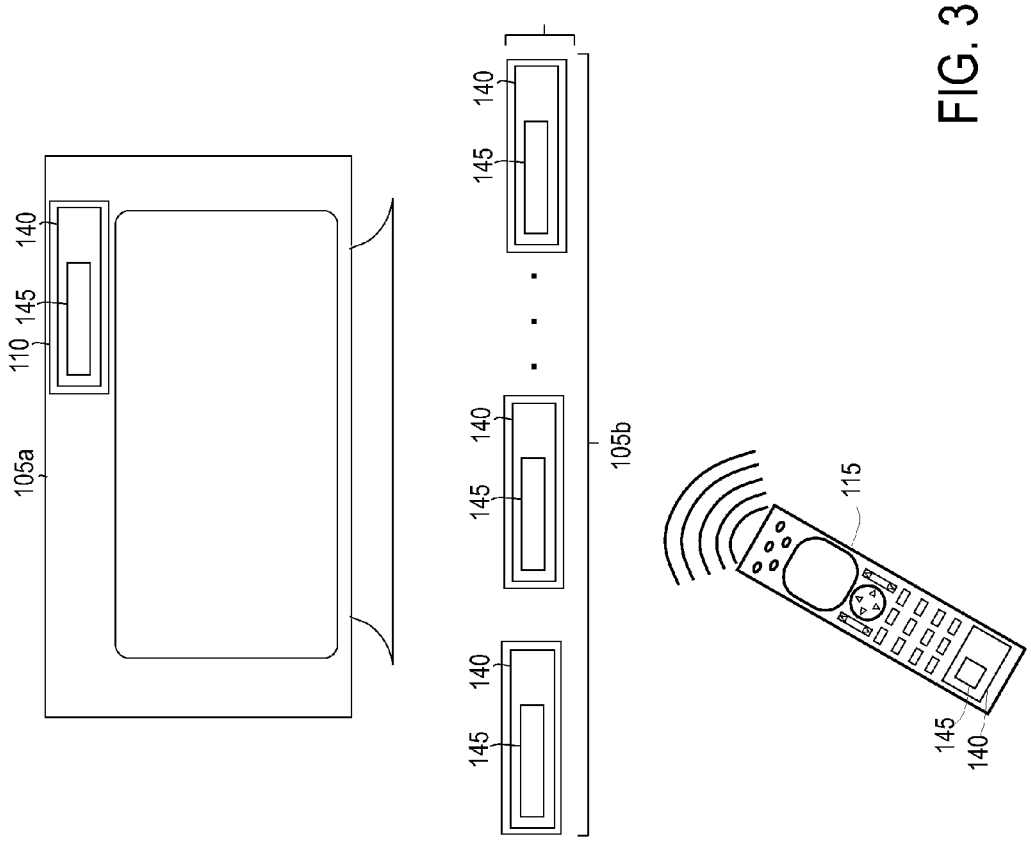
FIG. 3

APPARATUS AND METHOD FOR CONFIGURATION AND OPERATION OF A REMOTE-CONTROL SYSTEM

BACKGROUND OF THE INVENTION

The present invention generally relates to remote-control systems. More particularly, embodiments of the present invention relate to a remote-control system configured to operate on a variety of remote control platforms, such as High Definition Multi-Media Interface appliances.

Traditional remote-control devices for controlling appliances have typically been hand-held electronic devices, and have typically been configured to control a variety of appliances including televisions, DVD players, stereo equipment (e.g., CD players, tuners, amplifiers, etc.), personal video recorders (PVRs), set-top-boxes (cable television tuners, satellite dish tuners, etc.), surround sound devices, other remote-control devices (e.g., IR blasters, RF blasters, etc.), media applications on a computer, or other types of processor controlled devices, etc. Some remote-control devices are also configured to control heating systems, cooling systems, lighting, window coverings, and the like.

Modern remote-control devices have progressed from traditional hand-held electronic devices to remote-control systems that may be embedded in appliances, blasters, set-top-boxes, bridges, etc. One or more components of such embedded systems may continue to be hand-held, either in a form factor similar to a traditional remote-control device, or as a software-based controller embedded in hand-held devices, such as smartphones. As is well known by those of skill in the art, the High Definition Multi-Media Interface (HDMI) standard specifies the Consumer Electronic Control (CEC) standard, which provides for connected HDMI appliances (e.g., connected via HDMI cables) to remotely control one another. That is, the CEC standard provides that connected HDMI appliance may each include a remote-control system, which is embedded in an HDMI appliance, where each remote-control system in each connected HDMI appliance may control the other connected HDMI appliances. The CEC standard is an option standard and is not required to be implemented in HDMI appliances. The goal of the CEC standard is to simplify the remote control of HDMI appliances by providing that a single command entered in one HDMI appliance may be proliferated throughout a set of HDMI appliances to place the set of HDMI appliances in a desired state. For example, one of the more commonly expected remote control functions under the CEC standard is "one touch play." For one touch play, an HDMI DVD player, for example, receiving a play command to play a DVD may issue CEC command codes to an HDMI TV to power on, switch the input to the HDMI DVD player, and format the screen dimensions (e.g., widescreen) for the DVD. The HDMI DVD player may also issue CEC command codes to an HDMI surround sound system to power on and adjust to a given volume level and sound equalization setting. The foregoing described remote-control operation has traditionally required a series of button presses on one or more traditional remote-control devices. The CEC standard provides that these multiple commands may be accomplished with a single button press (e.g., press of the play button on the HDMI DVD player, the press of the play button on a traditional remote-control device configured to control the HDMI DVD player, etc.).

While the CEC standard was designed to simplify remote control operations, the CEC standard introduces a number of complications into remote-control systems embedded in HDMI devices. One complication that the CEC standard introduces is the allowance of custom CEC command codes for HDMI appliances. More specifically, custom CEC command codes may be created for some HDMI appliances where these custom CEC command codes are unrecognized and not understood by other HDMI appliances. Therefore, not all HDMI appliances that are interconnected will be configured to understand the custom CEC command codes of other HDMI appliances. Further, the CEC standard provides limited solutions for correcting and compensating for failed CEC command codes.

Therefore, new remote-control systems, such as new embedded remote-control systems, are needed to provide solutions for known short comings in the CEC standard as well as to provide enhanced functions not specified by the CEC standard.

BRIEF SUMMARY OF THE INVENTION

The present invention generally relates to remote-control systems. More particularly, embodiments of the present invention relate to a remote-control system configured to operate on a variety of remote control platforms, such as HDMI appliances.

According to one embodiment of the present invention, a method for configuring a remote-control system includes querying via a bus a High Definition Multi-Media Interface (HDMI) display for an Extended Display Identification Data (EDID) for the HDMI display; receiving via the bus from the HDMI display the EDID for the HDMI display; and storing via a processor in a memory the EDID and a link between the EDID of the HDMI display a set of command codes configured for controlling the HDMI display.

According to a specific embodiment, the set of command codes is a set of IR command codes or a set of CEC command codes. According to another specific embodiment, the method further includes storing via a processor in the memory another link between the EDID of the HDMI display and a model number for the HDMI display. According to another specific embodiment, the method further includes determining the model number from an inference from operation of a remote-control device, from querying a user of the remote-control device, or from downloading to the remote-control system the model number from a remote database.

According to another specific embodiment, the method further includes storing via a processor in the memory another link between the EDID of the HDMI display and a make of the HDMI display. The memory may be a local memory of the remote-control system or a remote memory accessible by a plurality of remote-control systems.

According to one embodiment of the present invention, a method for configuring a remote-control system includes querying via a bus a set of High Definition Multi-Media Interface (HDMI) appliances for a set of Consumer Electronic Control (CEC) identifiers, where the HDMI appliances of the set of HDMI appliances are respectively associated with the CEC vendor identifiers of the set of CEC vendor identifiers. The method further includes receiving via the bus from the set of HDMI appliances the set of CEC vendor identifiers. The method further includes storing via a processor in a memory the set of CEC vendor identifiers, and a set of links that respectively link in the memory the CEC vendor identifiers in the set of CEC vendor identifiers with sets of command codes for the set of HDMI appliances.

According to a specific embodiment, the method further includes storing via a processor in the memory another set of links respectively linking the CEC vendor identifiers of the set of CEC vendor identifiers and make identifiers of a set of make identifiers, which identify the HDMI appliances in set of HDMI appliances. According to another specific embodiment, the method further includes storing via a processor in the memory another set of links between the CEC vendor identifiers of the set of CEC vendor identifiers and model numbers of a set of model number for the HDMI appliances in the set of HDMI appliances.

According to one embodiment of the present invention, a method for operating a remote-control system includes monitoring a Consumer Electronic Control (CEC) bus for a CEC command code transmitted over the CEC bus from a first HDMI appliance to a second HDMI appliance, which is connected to the first HDMI appliances via an HDMI link. The method further includes monitoring the CEC bus for a response issued from the second HDMI appliance in response to receipt and execution of the CEC command code. The method further includes, if a response is not issued from the second HDMI appliance: i) determining an IR command code that corresponds to the CEC command code for the second HDMI appliance, and ii) transmitting the IR command code to the second HDMI appliance to perform a function associated with the CEC command code. The method further includes, if a response is issued from the second HDMI appliance, not transmitting an IR command code to the second HDMI appliance.

According to a specific embodiment, the method further includes not transmitting an IR command code to the second HDMI appliance if a response is not issued from the second HDMI appliance and if the second HDMI appliance is not configured to issue a response for receipt and execution of the CEC command code. According to another specific embodiment, the method further includes determining whether the second HDMI appliance is configured to transmit a response for receipt and execution of the CEC command code. The determining step may includes receiving from a remote database information for whether the second HDMI appliance is configured to transmit a response for receipt and execution of the CEC command code.

According to another specific embodiment, the method further includes if a response is not issued from the second HDMI appliance, then storing failure information in a memory for the CEC command code; and if a response is issued from the second HDMI appliance, then storing in memory pass information for the CEC command code. A function of the IR command code matches a function of the CEC command code.

According to one embodiment of the present invention, a method for building a database of command codes includes monitoring a CEC bus for a set of CEC command codes transmitted over the CEC bus; and comparing the set of CEC command codes transmitted over the CEC bus with sets of known CEC command codes for an HDMI appliances that received the set of CEC command codes. The method further includes identifying a subset of CEC command codes, which are included in the set of CEC command codes and which are not in the sets of known CEC command codes; and storing the subset of CEC command codes in memory as unrecognized.

According to a specific embodiment, the method further includes transferring the subset of CEC command codes to a remote database to query the remote database whether the CEC command codes in the subset of CEC command codes are stored in the remote database as recognized. According to another specific embodiment, the method further includes transferring function information for the subset of CEC command codes to the remote-control engine for use thereby, if the subset of CEC command codes are included in a set of known CEC command codes stored in the remote database.

According to another specific embodiment, the method further includes analyzing the subset of CEC command codes to determine the functions of the subset of CEC command codes, if the subset of CEC command codes are not included in a set of known CEC command codes stored in the remote database.

According to one embodiment of the present invention, a volume control method for controlling a volume of sound output from an appliance configured to receive a media stream, the method includes receiving an input at a multi-media gateway for raising the volume of sound output by an appliance for a media stream; and raising in the multi-media gateway an embedded-digital volume embedded in the media stream. The method further includes thereafter, transmitting the media-stream to the appliance for play on the appliance.

According to a specific embodiment, the method further includes if the received input causes the embedded-digital volume to be raised by the multi-media appliance to an embedded-digital volume maximum, directing the appliance to raise an analog volume control for the media stream. According to another specific embodiment, the method further includes if the received input causes the embedded-digital volume to be raised to a level below the embedded-digital volume maximum, thereafter maintaining the analog volume at a constant level.

According to another specific embodiment, the method further includes receiving a second input at the multi-media gateway or lowering the volume of sound output by the appliance; and directing the appliance to lower an analog volume control for the appliance.

While the foregoing paragraphs of the summary section describe several embodiments related to i) linking sets of CEC command codes to EDIDs and CEC vendor IDs, ii) building CEC command code databases, iii) determining CEC command code failures and action taken in view thereof (e.g., determining substitute command codes therefore, building a CEC command code database, etc.), the embodiments described herein are not so limited. Specifically, embodiments that are described with respect to sets of CEC command codes may be equally applied to other sets of command codes, such as set of IR command code, set of RF command codes, etc. For example, the embodiment described herein may be applied to linking EDIDs to IR command codes, linking CEC vendor IDs to IR command codes, determining whether IR command codes fail and determining alternative command codes therefore. Various embodiment of the present invention may be operable with bi-directional and two-way wired and wireless protocols (e.g., IP, RF, such as BT, etc.) over a standard medium or an open medium.

These and other benefits of the embodiments of the present invention will be apparent from review the following specification and attached figures.

BRIEF DESCRIPTION OF THE DRAWINGS

FIG. 1 is a simplified schematic of an entertainment system according to one embodiment of the present invention;

FIG. 3 is a simplified schematic of an entertainment system according to another embodiment of the present invention;

DETAILED DESCRIPTION OF THE INVENTION

Figure 2:
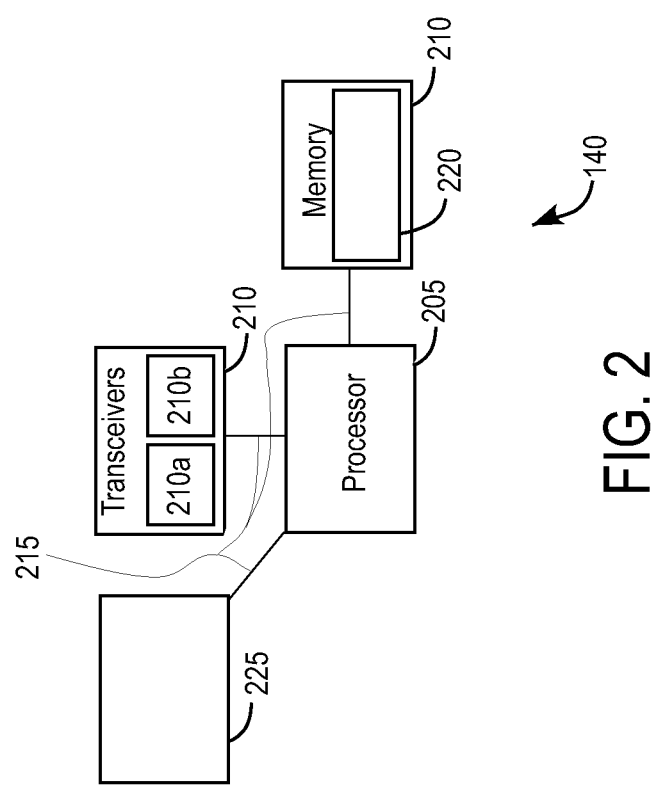
FIG. 2 is a simplified schematic of a remote-control system that may be included in a set of the HDMI appliances, a multi-media gateway, and/or a remote-control device.

The present invention generally provides a remote-control system. More particularly, embodiments of the present invention provide a remote-control system configured to operate on a variety of remote control platforms, such as High Definition Multi-Media Interface (HDMI) appliances.

Entertainment System Overview

FIG. 1 is a simplified schematic of an entertainment system 100 according to one embodiment of the present invention. Entertainment system 100 includes a set of HDMI appliances 105 and a multi-media gateway 110. A set as defined herein includes one or more elements. The set of HDMI appliances may include an HDMI display 105a and a set of HDMI sources 105b. The set of HDMI sources may be configured to source media (e.g., audio, video, still images, applications, etc.). The set of HDMI sources may include a set-top-box (e.g., cable set-top-box, satellite set-top-box, etc.), a personal video recorder (PVR), a DVD player (e.g., a Blu-ray™ disk player), a computer (desktop, laptop, netbook, tablet, PDA, etc.), a smartphone, a portable media player (iPod™, iPad™, etc.), a digital camera, a digital video camera, a digital media adapter, etc. According to some embodiments, two or more of these HDMI sources may be combined into a single electronic device. For example, the set-top-box may be combined with the PVR, DVD player, etc. The HDMI sources may be configured to source media to multi-media gateway 110 and HDMI display 105a. One or more of the HDMI sources may be configured to source media to another HDMI source. For example, a set-top-box may be an HDMI source for a PVR. Multi-media gateway 110 may be configured to operate the Google TV™ platform and may be a TV host. Multi-media gateway 110 may be the Logitech Revue™ multi-media gateway.

According to a further embodiment of the present invention, entertainment system 100 includes a remote-control device 115. Remote-control device 115 may be a hand-held remote-control device, such as a universal remote-control device. The remote-control device may be the remote-control keyboard of the Logitech Revue™ multi-media gateway, a Logitech Harmony™ Remote Control, a smart-phone device with a remote-control software application, etc.

According to another embodiment, entertainment system 100 includes a computer 122 or may be configured to communicate with computer 122. Computer 122 may include a computer memory (hard disk drive, flash memory, optical drive, etc.) configured to store computer code. Computer 122 may also include a display, and a set of input devices, which may include a computer keyboard, a mouse, etc. The remote-control system (e.g., operating on one of the HDMI appliances, the multi-media gateway, or the remote-control device) may be configured to communicate with computer 122 via a wired or wireless connection. For example, the remote-control system operating on the multi-media gateway may be configured to communicate with computer 122 via an Ethernet connection, a coaxial cable connection, a WiFi link provided by a local wireless router, Home RF, etc. Remote-control device 115 may similarly be configured to communicate with computer 122 via a docked connection, a WiFi link provided by a wireless router, Home RF, etc.

Computer 122 may be configured to communicate with a remote server 125 via a network 130 (e.g., the Internet). A server (e.g., remote server 125) as referred to herein includes one or both of a server computer and server software (e.g., a server operating system) operating on the server computer. Remote server 125 may include a computer memory (hard disk drive, flash memory, optical drive, etc.) configured to store computer code. Remote server 125 may also include a display, and a set of input devices, which may include a computer keyboard, a mouse, etc. Remote server 125 may be coupled to a remote database 135. Remote database 135 is configured to store sets of command codes, such as sets of IR command codes and sets of CEC command codes, which may include custom CEC command codes. The remote database is also configured to store a "link" that associates a set of command codes with an appliance (e.g., an HDMI appliance) that is configured to understand the set of command codes. The remote database may store the sets of command codes and the links under control of the remote server. For example, the remote server may be configured to direct the remote database to store a link that associates a given Sony Internet TV with the set of command codes (e.g., IR command codes and/or CEC command codes) configured to control the Sony Internet TV.

While the foregoing description describes a remote database being configured to store sets of command codes, links that associate sets of command codes with appliances, etc., the sets of command codes, links between set of command codes, etc., may be alternatively store, or additionally stored, in other storage devices, such as the storage devices of computer 122, the storage devices of the multi-media gateway, any of the HDMI appliances, etc.

According to some embodiments, the multi-media gateway and the circuits therein may be configured to perform the methods of operation of computer 122 described above. According to an embodiment where the multi-media gateway is configured to perform the methods of operation of computer 122, the multi-media gateway may communicate directly with the remote server 125 and/or the remote database 135 via the network. According to an embodiment where the HDMI display includes computer 122 or is configured to perform the methods of computer 122, the HDMI display may communicate directly with the remote server 125 and/or the remote database 135 via the network.

According to one embodiment, one or more of the HDMI appliances and/or the multi-media gateway may be configured to operate as remote-control devices for the other HDMI appliances. Each HDMI appliance and the multi-media gateway may include a remote-control system 140, which is configured to run a remote-control engine 145.

According to a further embodiment, entertainment system 100 may includes other HDMI appliances configured to play media, such as sound. These other HDMI appliance may include speakers, headsets, headphones, in-ear monitors etc.

FIG. 2 is a simplified schematic of a remote-control system 140 in accordance with an embodiment of the present invention that may be included in any or each of the HDMI appliances and the multi-media gateway. Remote-control system 140 includes a processor 205 (e.g., a microprocessor, a controller, such as a microcontroller, control logic, etc.), a memory 210, a set of transceivers 210, and a bus 215.

Memory 210 may be configured to store a local file or a local database 220, which includes sets of command codes. The sets of command codes in the local file or the local database may include at least one set of IR command codes (configured to be transmitted in IR or RF). The sets of command codes in the local file or the local database may also include at least one set of Consumer Electronic Control (CEC) command codes. The set of CEC command codes may be the standard CEC command codes specified by the HDMI standard or may be custom CEC command codes, which are permitted by the CEC standard. Memory 210 may be also configured to store computer code (e.g., compiled computer code) for one or more applications executable by the processor. According to one specific embodiment, memory 210 is configured to store an application for remote-control engine 145, which may include Logitech's Harmony Link™ engine.

The set of transceivers 210 may include an IR transceiver 210a and/or an RF transceiver 210b. An IR transceiver in at least one of the HDMI appliances may be configured to transmit IR command codes to, and receive IR command codes from, other IR transceivers in other HDMI appliances or the multi-media gateway. An IR transceiver in the multi-media gateway may be similarly configured to transmit IR command codes to, and receive IR command codes from, other IR transceivers in the HDMI appliances. The RF transceivers in the HDMI appliances and the multi-media gateway may be similarly configured to the IR transceivers. According to one embodiment, bus 215 includes a CEC bus over which CEC command codes may be communicated between the HDMI appliances and the multi-media gateway. According to one embodiment, the remote-control engine operating on the processor is configured to monitor transmission over the CEC bus. Monitoring of the CEC bus is described in further detail below.

Elements of a given remote-control system 140 in an HDMI appliance may be shared with other systems in the HDMI appliance. Elements of a given remote-control system 140 in the multi-media gateway may be shared with other systems in the multi-media gateway. For example, the processor may be configured for use by one or more application operating on an HDMI appliance. The bus may similarly be configured to be used (i.e., included) in one or more system. For example, the CEC bus may be used by the HDMI systems in the HDMI appliances.

FIG. 3 is a simplified schematic of an entertainment system 300 according to one embodiment of the present invention. Entertainment system 300 differs from entertainment system 100 described above in that in entertainment system 300, multi-media gateway 110 is incorporated in the HDMI display and may perform the methods of operation of multi-media gateway 110 as described herein. According to some embodiment, the HDMI display includes both multi-media gateway 110 and computer 122 incorporated therein.

Remote-control device 115 may similarly be configured to include a processor configured to operate the remote-control engine and a memory configured to store the remote control engine. The memory may also be configured to store a local file or a local database where the local file or the local database includes sets of command codes. The sets of command codes may be sets of IR command codes and sets of CEC command codes for controlling the HDMI appliances, the multi-media gateway, and/or other appliances (e.g., non-HDMI appliances). Remote-control device 115 may be configured to transmit and receive in IR, RF, etc. and may include a communication port for communication of CEC command codes. According to one embodiment, the multi-media gateway is a bridge device for communicating command codes received from remote-control device 115 to the HDMI appliances. The multi-media gateway may be configured to translate received command codes, such as translating received command codes (e.g., received IR command codes) to CEC command codes, or translating received command codes (e.g., received IR command codes) to RF command codes. U.S. patent application Ser. No. 12/731,086, filed Mar. 24, 2010, of Saumil Makim et al., describes many embodiments of bridge devices configured to translate command codes for different communication networks and is incorporated by reference in its entirety herein for all purposes.

Collect the EDID from the HDMI Display

According to one embodiment, the remote-control engine operating on the remote-control system of the multi-media gateway is configured to collect the Extended Display Identification Data (EDID) of HDMI display 105a. For example, the remote-control engine may collect the EDID of the HDMI display if the multi-media gateway and HDMI display are coupled by an HDMI cable. The remote-control engine of the multi-media gateway or the remote control device may query the HDMI display via a two-way IR or RF communication to collect the EDID. The multi-media gateway or the remote-control device may be configured to "link" the EDID for the HDMI display with the locally stored set of command codes (IR command codes and/or CEC command codes) for the HDMI display. The link may be an entry in a local memory in a file, database, etc. where the EDID is stored with the sets of command codes.

According to another embodiment, the multi-media gateway is configured to transfer the EDID, for example, via computer 122 to remote server 125 and remote database 135 where the EDID may be linked with the sets of command codes for the HDMI display. Alternatively, according to the embodiment where the multi-media gateway includes computer 122 or is otherwise network enabled, the multi-media gateway is configured to transmit the EDID directly to the remote server via a network connection. According to another embodiment, the EDID is linked locally by the remote-control engine to the sets of command codes for the HDMI display, and then the links are transferred to the remote server 125 and remote database 135. According to another alternative embodiment, the HDMI display may be configured to transmit its EDID to remote server 125 for storage in remote database 135, for example, via computer 122, so that the EDID may be linked to the sets of command codes for the HDMI display in the remote database. According to a further embodiment, the EDID for the HDMI display may also be linked to the make (e.g., manufacturer name) and/or the model number of the HDMI display in the local memory in the multi-media gateway, in the local memory of the remote-control device, or in remote database 135. The remote-control engine operating on one of the HDMI display, the multi-media gateway, or the remote-control device may collect the EDID, transmit the EDID to the remote database, and request that above described links be established.

According to one embodiment, the multi-media gateway, the HDMI display, and/or the computer may be configured to configure the multi-media gateway. That is, the multi-media gateway, the HDMI display, and/or the computer may be configured to store computer code on a non-transitory memory device for configuring the multi-media gateway. The multi-media gateway may be configured by supplying sets of command codes to the multi-media gateway for the appliances that are in entertainment system 100, by setting up user preferences, establishing user tracking preferences, etc.

The make and/or the model number of an HDMI appliance or other appliance may be determined by inferring the make and/or the model number via user interaction with the user's remote-control device, by collecting the make and/or the model number from a user, or collecting a make and model number from the remote database where the where the make and/or model number may be stored and retrieved. The make and/or the model number for an HDMI appliance is typically determined during a setup process of the remote-control device, the multi-media gateway, or the HDMI appliance (e.g., at the time the HDMI appliance is added to entertainment system 100). Once a make and/or a model number for an appliance is determined, the make and/or the model number may be transmitted to the remote server for storage in the remote database where the make and/or the model number may be provided for use by other entertainment systems of other users of the remote server and remote database. U.S. patent application Ser. No. 11/267,528, filed Nov. 3, 2005, titled "Configuration Method for a Remote Control Via Model Number Entry for a Controlled Device," of Glen McLean Harris et al. describes a user interactive method for inferring a make and/or model number of an appliance and is incorporated by reference herein in its entirety for all purposes.

According to one embodiment, during a "setup" process of the remote-control device, the multi-media gateway, or any device including the remote-control system and remote-control engine are configured to install sets of command codes for controlling appliances, such as HDMI appliances. A setup process may be executed, for example, at the time a user first purchases a remote-control device, a multi-media gateway, etc., may be executed at a user's request, or may be executed at the initiation of computer system 122 or the remote server 135, etc. During the execution of a setup process Collect the CEC Vendor ID from HDMI Appliances According to another embodiment of the present invention, remote-control engine operating on the remote-control system of the multi-media gateway is configured to collect the CEC vendor identifier (ID) of one or more of the HDMI appliances in entertainment system 100. In one embodiment an HDMI appliance is identified by the HDMI appliance's CEC vendor ID. In one embodiment an HDMI appliance is identified by its On Screen Display (OSD) string. In one embodiment, the HDMI appliance is identified by aggregating the set of CEC protocol properties. In one embodiment an HDMI appliance is identified by transmitting one or more CEC command codes to the HDMI display and monitoring how the HDMI display responds to one or more standard or custom CEC command codes. In one embodiment an HDMI appliance is identified by its response time to reply to one or more CEC command codes. In one embodiment an HDMI appliance is identified by a combination of the previously described methods. The determined identity of the HDMI appliance is further referred to as the CEC vendor ID.

The remote-control engine of the multi-media gateway or the remote-control device may be configured to "link" the CEC vendor ID for an HDMI appliance with the locally stored (e.g., in the local memory of the multi-media gateway or the remote-control device) sets of command codes (set of IR command codes and/or set of CEC command codes) for the HDMI appliance. Alternatively, the multi-media gateway or the remote-control device may be configured to transfer the CEC vendor ID, for example, via computer 122 to remote server 125 for storage in remote database 135 where the CEC vendor ID may be linked with the sets of command codes for the HDMI appliance. According to a further embodiment, the CEC vendor ID for an HDMI appliance may also be linked to the make (i.e., manufacturer name, such as Sony, Magnavox, etc.) and/or the model number of the HDMI appliance in the local memory (e.g., in a file, a database, etc.) in the multi-media gateway, the remote-control device, or in the remote database 135. The remote-control engine operating on the multi-media gateway or the remote-control device may collect the CEC vendor ID, transmit the CEC vendor ID as described above, and/or request that the links be established. According to another embodiment, the remote server controlling the remote database is configured to establish the links in the remote database.

According to one embodiment, linking an EDID to a make or a model number of the HDMI display initiates the remote server to link the EDID to a set of IR command codes for the HDMI display stored in remote database 135, and/or to link the EDID to a set of CEC command codes for the HDMI display stored in remote database 135. According to one embodiment, linking a CEC vendor ID to a make or a model number of an HDMI appliance initiates the remote server to link the CEC vendor ID to a set of IR command codes for the HDMI appliance stored in remote database 135, and/or to link the CEC vendor ID to a set of CEC command codes for the HDMI appliance stored in remote database 135.

Build Database of Command Codes

Figure 4:
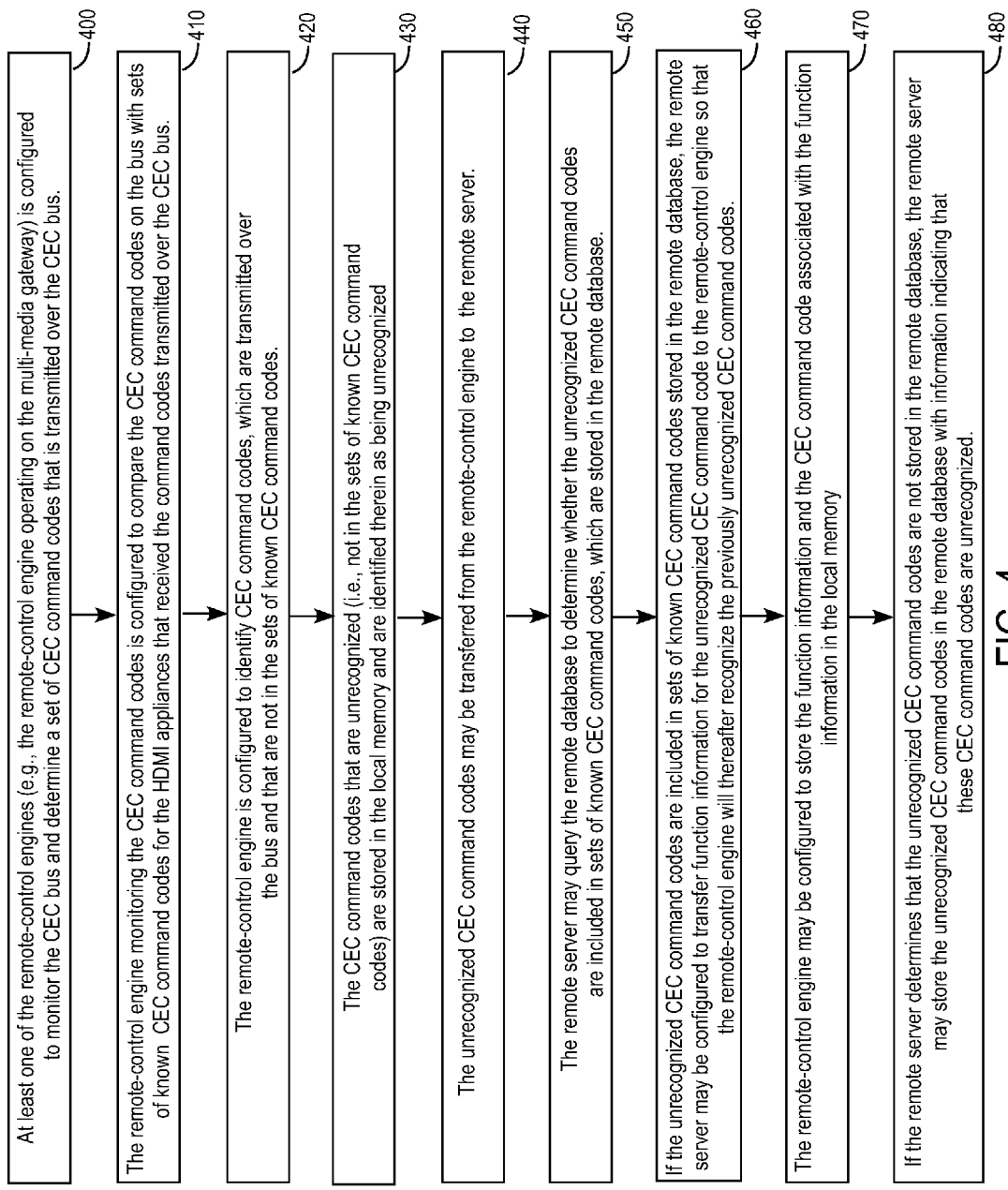
FIG. 4 is a high-level flow diagram of a method for building a database of command codes according to one embodiment of the present invention.

FIG. 4 is a high-level flow diagram of a method for building a database of command codes according to one embodiment of the present invention. The high-level flow diagram is exemplary and not limiting on the claims. Various steps shown in the high-level flow diagram may be added, combined, and/or removed without deviating from the scope and purview of the described embodiment. At a step 400, at least one of the remote-control engines (e.g., the remote-control engine operating on the multi-media gateway) is configured to monitor the CEC bus as described above and determine a set of CEC command codes that is transmitted over the CEC bus. At a step 410, the remote-control engine monitoring the CEC command codes is configured to compare the CEC command codes on the CEC bus with sets of known CEC command codes for the HDMI appliances that received the CEC command codes transmitted over the CEC bus. The sets of known CEC command codes may be stored in the local memory of the remote-control system operating the remote-control engine. At a step 420, the remote-control engine is configured to identify CEC command codes, which are transmitted over the bus and that are not in the sets of known CEC command codes, which are stored in the local memory. The local memory may be the local memory of the multi-media gateway. If the CEC command codes transmitted over the bus are stored in sets of known CEC command codes stored in the local memory, no action may be taken by the remote-control engine. At a step 430, the CEC command codes that are unrecognized (i.e., not in the sets of known CEC command codes) are stored in the local memory and are identified therein as being unrecognized.

According to one specific embodiment, the unrecognized CEC command codes may be transferred from the remote-control engine (e.g., from the multi-media gateway) to the remote server, step 440. The remote server may query the remote database to determine whether the unrecognized CEC command codes are included in sets of known CEC command codes, which are stored in the remote database, step 450. If the unrecognized CEC command codes are included in sets of known CEC command codes stored in the remote database, the remote server may be configured to transfer function information for the unrecognized CEC command code to the remote-control engine so that the remote-control engine will thereafter recognize the previously unrecognized CEC command codes, step 460. The remote-control engine may be configured to store the function information and the CEC command code associated with the function information in the local memory, such as the local memory of the multi-media gateway, step 470. Alternatively, if the remote server determines that the unrecognized CEC command codes are not stored in the remote database, the remote server may store the unrecognized CEC command codes in the remote database, step 480, with information indicating that these CEC command codes are unrecognized.

The unrecognized CEC command codes stored in the remote database may thereafter be analyzed to determine the functions associated with the unrecognized command codes. For example, the unrecognized CEC command codes may be analyzed by a human user to determine the functions associated with the unrecognized command codes. A human user may use a remote-control engine (e.g., operating on a multi-media gateway or other test device) to transfer the unrecognized CEC command codes to a set of HDMI appliance and monitor the changes that occur on the set of HDMI appliances. The human user may then direct the remote server to store the functions for the previously unrecognized CEC command codes in the remote database for distribution to various entertainment system of various users that include the HDMI appliance.

According to one embodiment of the present invention, the remote server may be configured to send a transmission to the remote-control engine to inform the remote-control engine that the unrecognized CEC command codes are unrecognized by the remote server. Thereafter, the remote-control engine may be configured to attempt to determine the functions associated with the unrecognized CEC command codes. For example, the remote-control engine may be configured to compare two sets of states of an HDMI appliance where the first set of states is for the HDMI appliance before the set of unrecognized CEC command codes is issued to the HDMI appliance, and the second set of states is for the HDMI appliance after the set of unrecognized CEC command codes is issued to the HDMI appliance. If the remote-control engine determines a difference in the sets of states, the remote-control engine may be able to determine the functions of the set of unrecognized CEC command codes. The remote-control engine, via the multi-media gateway may transmit IR command codes to the HDMI appliance to determine the state of the HDMI appliance. Alternatively, the remote-control device may be configured to display a set of interactive questions on the display of the remote-control device for interaction with a user of the remote-control device to determine the functions associated with the set of unrecognized CEC command codes. The remote-control engine operating on the multi-media appliance might direct the remote-control device to display the interactive questions and perform the analysis of the unrecognized CEC command codes. For example, the remote-control device might display to the user that the remote-control engine operating on the mulit-media appliance is issuing one of the unrecognized CEC command codes to the HDMI display, and then ask the user to input any observed changes into the remote-control device. If the remote-control device determines the functions for the previously unrecognized CEC command codes, the remote-control device may store function information for the previously unrecognized CEC command codes and transfer the function information to the remote-control engine operating on the multi-media gateway.

The remote-control engine (e.g., operating on the multi-media gateway) may transfer the determined functions for the previously unrecognized CEC command codes to the remote server for storage in the remote database. The remote server may generate soft buttons and macros for the remote-control engine for the previously unrecognized CEC command codes. The remote serve may transfer the soft buttons and macros for the previously unrecognized CEC command codes to the remote-control engine for storage and use by the remote-control engine. The determined functions, soft button, and/or macros for the previously unknown CEC command codes may be transferred to the multi-media gateway of other users. The remote server may share the function information with other entertainment systems of other users.

In accordance with one embodiment of the present invention, the remote database is "continually" built and expanded over a period of time, such as days, months, and years, using information from a plurality of users, a plurality of remote control engines, a plurality of multi-media gateways, etc. Information from various users, remote control engines, multi-media gateways is uploaded to the remote database to build, improve, and expand the remote database, and this expanded information may be "continually" downloaded (e.g., hourly, daily, weekly, monthly, etc.) onto several remote control engines for use by those several remote control engines, which may be owned and operated by a plurality of other users. Details of various methods for uploading command codes to a remote database and downloading command codes from the remote database to various remote control devices, such as the multi-media gateway operating the remote control engine may be found in U.S. Pat. No. 7,436,319, titled "Method an Apparatus for Uploading and Downloading Remote Control Codes," of Glen McLean Harris et al. and is herein incorporated by reference in its entirety.

Operation of the Remote Control Engine

Figure 5:
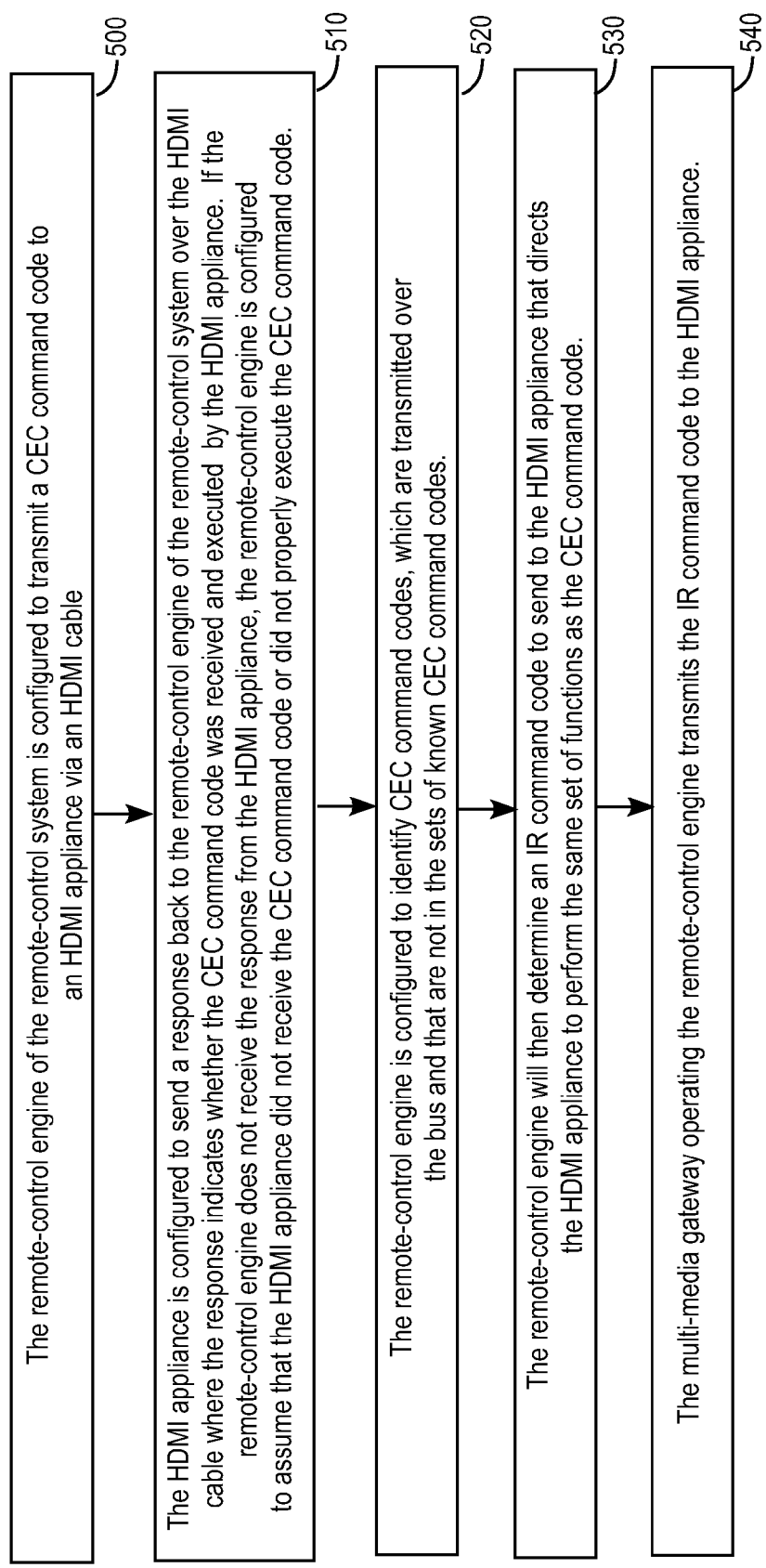
FIG. 5 is a high-level flow diagram of a method for operating a remote-control engine on a remote-control system of the multi-media gateway according to one embodiment of the present invention

FIG. 5 is a high-level flow diagram of a method for operating a remote-control engine on a remote-control system of the multi-media gateway according to one embodiment of the present invention. The high-level flow diagram is exemplary and not limiting on the claims. Various steps in the high-level flow diagram may be added, combined, and/or removed without deviating from the scope and purview of the described embodiment. At a step 500, the remote-control engine of the remote-control system is configured to transmit a CEC command code to an HDMI appliance via an HDMI cable. At a step 510, the HDMI appliance is configured to send a response (sometimes referred to in the art as a "handshake") back to the remote-control engine of the remote-control system over the HDMI cable where the response indicates whether the CEC command code was received and executed by the HDMI appliance. If the remote-control engine does not receive the response from the HDMI appliance, the remote-control engine is configured to assume that the HDMI appliance did not receive the CEC command code or did not properly execute the CEC command code, step 520. At a step 530, the remote-control engine will then determine an IR command code to send to the HDMI appliance that directs the HDMI appliance to perform the same set of functions as the CEC command code. At a step 540, the multi-media gateway operating the remote-control engine will transmit the IR command code to the HDMI appliance. For each CEC command code sent to an HDMI appliance for which a response is not received back from the HDMI appliance, the multi-media gateway may send the CEC command code to the remote server for storage in the remote database and analysis by the remote server to determine why the CEC command code failed. Alternatively, the remote-control engine may analyze the CEC command code to determine why the CEC command code failed.

According to a particular embodiment, the method described above with respect to FIG. 5 is executed if the remote control engine has "response" information that indicates that the HDMI appliance is configured to send responses to the remote control engine for received CEC command codes. If the HDMI appliance is not configured to send response information for received CEC command codes, the method described above with respect to FIG. 5, may not be executed for the HDMI appliance, but may be executed for other HDMI appliances. The remote control engine may collect the response information for an HDMI appliance from the remote database during a setup process of the remote control engine or based on a specific query issued from the remote control engine to the remote database. According to one embodiment, the remote database is configured to store the response information for at least a portion of the HDMI appliances and supply this response information to the remote control engine as described. According to one alternative embodiment, the HDMI appliance is configured to provide the response information to the remote control engine, for example during setup of the remote control engine, during initial connection of the HDMI appliance to the entertainment system, based on a query from the remote control engine, etc.

According to another alternative embodiment, the remote-control engine of the remote-control system operating on the multi-media gateway may determine from the remote server that a given HDMI appliance is not configured to receive CEC command codes, and will by default send IR command codes to the given HDMI appliance instead of sending CEC command codes.

According to another alternative embodiment, the remote-control engine (e.g., operating on the multi-media gateway) may receive a set of custom CEC command codes from the remote server for an HDMI appliance. The remote-control engine may then transmit these custom CEC command codes to the HDMI appliance instead of sending IR command codes to the HDMI appliance to control the HDMI appliance.

Figure 6:
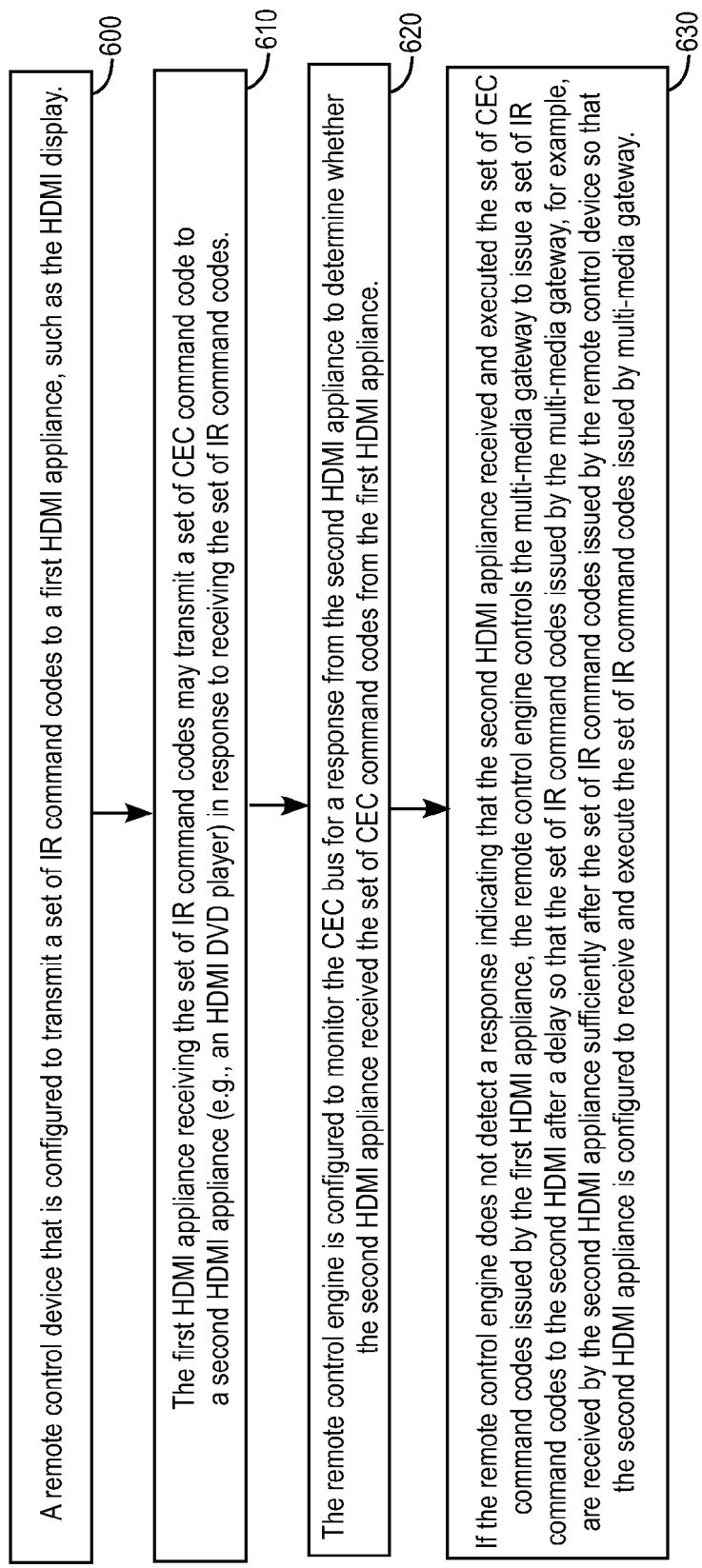
FIG. 6 is a high-level flow diagram of a method for operating a remote-control engine on a remote-control system of the multi-media gateway according to one embodiment of the present invention.

FIG. 6 is a high-level flow diagram of a method for operating a remote-control engine on a remote-control system of the multi-media gateway according to one embodiment of the present invention. The high-level flow diagram is exemplary and not limiting on the claims. Various steps in the high-level flow diagram may be added, combined, and/or removed without deviating from the scope and purview of the described embodiment. At a step 600, a remote control device that is configured to transmit a set of IR command codes to a first HDMI appliance, such as the HDMI display. At a step 610, the first HDMI appliance receiving the set of IR command codes may transmit a set of CEC command code to a second HDMI appliance (e.g., an HDMI DVD player) in response to receiving the set of IR command codes. For example, the set of IR command codes may be a macro for the HDMI DVD player playing a DVD and the HDMI display displaying the played DVD. According to one embodiment, if the second HDMI appliance does not support the CEC standard, multi-media gateway 110 may declare itself on the CEC bus as being the second HDMI appliance so that the first HDMI appliance will send CEC command codes to the second HDMI device's CEC address (i.e., the multi-media gateway) when receiving IR commands from remote 115. At a step 620, the remote control engine is configured to monitor the CEC bus for a response from the second HDMI appliance to determine whether the second HDMI appliance received the set of CEC command codes from the first HDMI appliance. At a step 630, if the remote control engine does not detect a response indicating that the second HDMI appliance received and executed the set of CEC command codes issued by the first HDMI appliance, the remote control engine, e.g., operating on multi-media gateway 110, may control the multi-media gateway to issue a set of IR command codes to the second HDMI appliance where the set of IR command codes is configured to control the second HDMI appliance similarly to the set of CEC command codes. According to one embodiment, the remote control engine may transmit the set of IR command codes to the second HDMI appliance after a delay so that the set of IR command codes issued by the multi-media gateway, for example, are received by the second HDMI appliance sufficiently after the set of IR command codes issued by the remote control device so that the second HDMI appliance is configured to receive the set of IR command codes issued by multi-media gateway 110. That is, the delay is sufficiently long so that the second HDMI appliance will not ignore the set of IR command codes issued by multi-media gateway 110. The delay may be a default time period, e.g., half of a second, or may determined empirically to the second HDMI appliance. The empirical determination of the delay may be performed by the remote control engine operating on multi-media gateway 110, for example. The delay may be empirically determined via questions being issued to a user of multi-media gateway 110, by a technician or engineer operating multi-media gateway 110 and the second HDMI appliance, etc. The appropriate delays for issuing sets of IR command codes that do not "interfere" with other sets of IR command codes may be stored in the remote database and transmitted to multi-media gateway 110, for example, during a setup procedure of the entertainment system or at the time the second HDMI appliance is added to the entertainment system.

According to another embodiment, the states of the HDMI appliances are tracked by a remote-control engine of a remote-control system on the multi-media gateway. The remote-control engine may track the power on/off state of an HDMI appliance and track the input state of the HDMI appliance, such as the HDMI display. The states may be tracked by knowing initial states of the HDMI appliance, and thereafter calculating and updating the states based on the CEC command codes transmitted to the HDMI appliance. The remote-control engine may track the states of the HDMI appliance based on the CEC command codes transmitted from the multi-other media gateway to the HDMI appliance and/or based on the CEC command codes transmitted by remote-control engines (e.g., operating on other HDMI appliances). For example, the remote-control engine tracking the states of the HDMI appliance, which received the CEC command codes, may monitor the CEC bus to track all of the CEC command codes transmitted to this HDMI appliance. According to one alternative embodiment, the power on/off state of an HDMI appliance is determined from the absence of a CEC command code being detected on the CEC bus by the remote control engine (i.e. by detecting that a given HDMI appliance has not sent any CEC command codes for a predetermined time). Some HDMI appliance do transmit regular CEC packets (e.g., get VendorID or query OSD name) after being powered on.

Thereafter, the remote-control engine may determine whether a response is issued by the HDMI appliance indicating whether the CEC command codes were received and executed by the HDMI appliance. The response may be issued to the remote-control engine if the remote-control engine issued to the CEC command codes, or the remote-control engine may monitor the CEC bus for all responses issued by the HDMI appliance to other HDMI appliances to determine whether the HDMI appliance received and executed the CEC command codes.

If the remote-control engine determines that an HDMI appliance is not in an intended state (e.g., powered off when the power is supposed to be on, or not in the correct input, e.g., HDMI 1 input instead of the intended HDMI 2 input) after the CEC command codes are transmitted to the HDMI appliance, then the remote-control engine is configured to determine a set of IR command codes to transmit to the HDMI appliance to place the HDMI appliance in the intended states (e.g., power on and input set to HDMI 2). It will be understood the while the foregoing description describes the remote-control engine of the multi-media gateway determining the states of the HDMI appliance, the described remote-control engine may operate on any of the HDMI appliances. U.S. Pat. No. 6,784,805, titled "State-Based Remote Control System" of Glen McLean Harris et al. describes a remote-control device that is configured to operate a remote-control engine that is configured to track the states of appliances based on command codes issued to the appliances, and is incorporated by reference herein in its entirety.

The following specific example is provided to add clarity to the foregoing described embodiment. If a DVD player (e.g., a first HDMI appliance) sends CEC command codes to the HDMI display to power on the HDMI display and to set the input of the HDMI display to the HDMI 2 input, the remote-control engine (e.g., operating on the multi-media gateway) monitoring the CEC bus will store information that indicates that the HDMI display is supposed to be in a power on state, and the HDMI display is supposed to have the input set to HDMI 2 input. The intended states may be stored locally by the remote-control engine in local memory (e.g., of the multi-media gateway which may be operating the remote-control engine). The remote-control engine by tracking the CEC command codes issued there from or by monitoring the CEC bus, is configured to determine that the HDMI display is supposed to be powered on and in the HDMI 2 input state. The remote-control engine monitoring the responses from the HDMI display may then determine whether the HDMI display is powered on and in the HDMI 2 input. If the HDMI display does not issue a response to the CEC command codes, the remote-control engine is configured to determine the CEC command was not successfully received and/or executed by the HDMI display. If the remote-control engine determines that power is off for the HDMI display and the input for the HDMI display is not the HDMI 2 input, then the remote-control engine may direct the multi-media gateway to send a set of IR command codes to the HDMI display to power on the HDMI display and change the input to the HDMI 2 input. The foregoing described example is not limiting on the claims as will be well understood by those of skill in the art. According to an alternative embodiment, other states in addition to the power on/off state and the input state may be monitored by the remote-control engine such as the channel state, the volume state, the surround sound state, the output state (e.g., the audio output state), etc. According to another alternative embodiment, remote-control engine may track the states of the HDMI appliances by transmitting queries to an HDMI appliance receiving a set of CEC command codes via IR communication, RF communication, or other CEC command codes.

According to a further embodiment, if the remote-control engine determines that a set of CEC command codes has not been executed correctly by an HDMI appliance, the remote-control engine may set a display on the display screen (e.g., LED display) of the remote-control device (e.g., a smartphone operating a remote control application, which may include the remote-control engine, a handheld remote-control device, etc.) based on the incorrect execution of the set of CEC command codes. The remote-control engine may set the display to include a set of screen buttons (sometimes referred to as soft button in the art) for CEC command codes that failed and/or for macros (i.e., sets of CEC command codes) that include the failed CEC command codes. For example, the remote-control engine operating on the multi-media gateway may determine that a power-on CEC command code issued to the HDMI display did not power on the HDMI display. The remote-control engine may thereafter be configured to display screen buttons for CEC command codes or for macros that include the power-on CEC command code, but not display screen buttons for CEC command codes and macros that do not include the power-on CEC command code. For example, a Watch TV command (e.g., a macro) may include a set of CEC command codes that includes the power-on CEC command code for the HDMI display, include a CEC command code for setting the input of the HDMI display for the set-top-box, and includes a CEC command code for setting the volume of the HDMI display to a predetermined volume (e.g., a relatively comfortable volume). Because the Watch TV command includes the power-on CEC command code, this command may be displayed on the display if the power-on command code for the HDMI display failed in the previous issued set of command codes. According to a further example, the Change to HDMI 2 input command will not be displayed on the display if the power-on CEC command code failed because the set of CEC command codes for the command Change to HDMI 2 input does not include the power-on CEC command code. More specifically, the Change to HDMI 2 input command will not be displayed because the Change to HDMI 2 input will not be executed by the HDMI display if the HDMI display is powered off.

According to a further embodiment, the CEC command code option may be disabled for one or more HDMI appliances. For example, the DVD player may not be configured to issue CEC command codes. The remote-control engine is configured to query each HDMI appliance to determine whether CEC command codes are disabled for the HDMI appliances. If the CEC command codes are disabled for an HDMI appliance, the remote-control system is configured to direct the multi-media gateway to transmit IR command codes in place of the disabled CEC command codes. For example, if a command is issued to the DVD player to play a DVD, and the multi-media gateway has determined that CEC command codes are disabled for the DVD player, then the multi-media gateway will send an IR command code or a CEC command code to the HDMI display to power on the HDMI display (if the HDMI display is not already on) and send an IR command code or a CEC command code to the HDMI display to change the input to the HDMI 2 input.

According to another embodiment, after the remote-control engine determines the EDID for the HDMI display and/or the CEC vendor IDs for the other HDMI appliances, the remote-control engine is configured to transfer the EDID and the CEC vendor IDs to the remote server. The remote-control engine may query the remote server to determine whether specific CEC command codes do not exist in the set of CEC command codes for the HDMI display and sets of CEC command codes for the other HDMI appliances. The remote server may use the EDID and the CEC vendor IDs to retrieve sets of CEC command codes from the remote database for the EDID and the CEC vendor IDs. The remote server may then compare the sets of CEC command codes retrieved from the remote database with a set of CEC command codes specified by the CEC standard to determine whether CEC command codes are missing from the sets of CEC command codes retrieved from the remote database. If the remote server determines that a specific CEC command code does not exist in a set of command codes retrieved from the remote database, the remote server will send information to the remote-control engine where the information indicates the CEC command code does not exist in the sets of CEC command codes presently available for the HDMI display or the other HDMI appliances. The remote-control engine may then determine an IR command codes for the CEC command codes missing from the sets of CEC command codes, and issue those determined IR command codes should the missing CEC command codes need to be transmitted to an HDMI appliance. While the foregoing analysis of CEC command codes is described to happen when the remote-control engine transfers its CEC command code or CEC vendor ID, the analysis may also have been previously performed on the remote server, the result of which has been persisted in the remote database 135 and is retrieved and served back to the remove-control engine upon such request. While the foregoing analysis of missing CEC command codes is described as taking place on the remote server operating in cooperation with the remote database, the remote-control engine may be configured to execute the same analysis locally using the local database in the multi-media gateway or the like to determine whether CEC command codes are missing from sets of CEC command codes stored in the local database of the multi-media gateway or the like.

For example, the multi-media gateway may send the CEC vendor ID for the DVD player to the remote server and query the remote server to determine whether any CEC command codes for the DVD player are not included in the set of CEC command codes for the DVD player compared to the standard set of CEC command codes specified by the CEC standard. The remote server may use the CEC vendor ID to identify the set of CEC command codes for the DVD player in the remote database. If the remote server determines that a CEC command code does not exist for directing an HDMI display to change input to the HDMI 2 input, for example, then the remote server will send information to the remote-control engine indicating that the CEC command code for changing the input to the HDMI 2 input in not included in the set of CEC command codes for the DVD player. The remote-control engine will then store the information locally, and will issue an IR command code to the HDMI display to change the input to the HDMI 2 input, for example, if the DVD player receives a command to play a DVD.

According to another embodiment, the remote-control engine is configured to query the remote server for custom CEC command codes and/or device-specific CEC command codes for the HDMI display and the HDMI appliances for which the remote-control engine collected the EDID and the CEC vendor IDs. The remote server may use the EDID and the CEC vendor IDs to query the remote database for custom CEC command codes and device-specific CEC command codes associated with the EDID and the CEC vendor IDs. The remote server is configured to send the custom CEC command codes and/or device-specific CEC command codes to the remote-control engine for the HDMI display and/or the HDMI appliances. The remote-control engine is configured to store the received custom CEC command codes and the device-specific CEC command codes in a local database. More specifically, the remote-control engine is configured to store received custom CEC command codes and device-specific CEC command codes in the sets of CEC command codes for the specific HDMI devices for which the custom CEC command codes and device-specific CEC command codes are configured to control. The remote-control engine will then be configured to transmit the custom CEC command codes and/or device-specific CEC command codes to the HDMI display and/or the HDMI appliances to control the HDMI display and/or the HDMI appliances. The custom CEC command codes and device-specific CEC command codes may be transferred to each HDMI appliance for local storage therein and for use.

According to one embodiment, the remote server and/or the remote-control engine are configured to determine the appropriate conditions for transmitting the custom CEC command codes and/or the device-specific CEC command codes. The remote server and/or the remote-control engine may also be configured to determine macros into which the custom CEC command codes and/or the device-specific CEC command codes may be inserted for transmission by the remote-control engine. U.S. patent application Ser. No. 11/199,922 (U.S. Pat. No. 7,436,319), filed Aug. 8, 2005, titled "Method an Apparatus for Uploading and Downloading Remote Control Codes," of Glen McLean Harris et al. described a method and apparatus for uploading command codes or identifiers for command codes that are determined to correctly control an appliance (such as an HDMI appliance) via a remote-control device, and thereafter downloading the command codes or the identifiers to other remote-control devices for other users. U.S. patent application Ser. No. 11/199,922 is incorporated by reference herein in its entirety for all purposes.

Volume Control of Appliances

According to one embodiment, the remote-control engine (e.g., operating on the multi-media gateway) is configured to control the volume output of a sound system of an HDMI appliance (e.g., the speakers in the HDMI display, a surround sound system, etc.) or other appliance (e.g., a television, a surround sound system, etc.) for optimal sound quality. For example, the remote-control engine may be configured to receive an input for raising the volume output of a sound system. The received input of the remote-control engine may come via the remote-control device, which may receive an input for raising the volume via a button press by a user. While button presses are discussed herein for providing input to a remote-control device, it will be understood that a remote-control device or other device (e.g., an HDMI appliance) may receive an input via a variety of devices and methods, such as touchpad, voice recognition, gesture recognition (e.g., a swipe of a finger on a touch pad, a free space gesture, etc.), a slider, etc.

Figure 7:
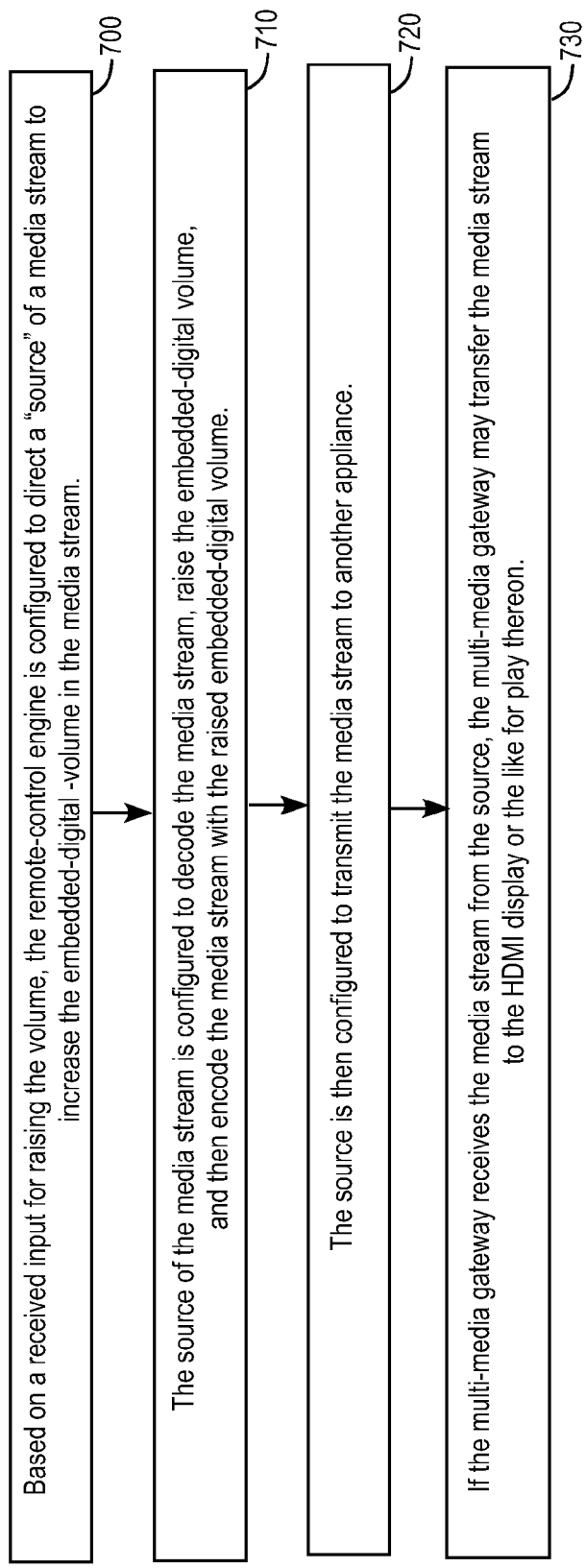
FIG. 7 is a high-level flow diagram of a method for raising the volume of sound generated by an appliance so as to reduce the signal to noise ration of the sound.

FIG. 7 is a high-level flow diagram of a method for raising the volume of sound generated by an appliance so as to reduce the signal to noise ration of the sound. The high-level flow diagram is exemplary and not limiting on the claims. Various steps in the high-level flow diagram may be added, combined, and/or removed without deviating from the scope and purview of the described embodiment. At a step 700, based on the received input for raising the volume, the remote-control engine is configured to direct a "source" of a media stream to increase the embedded-digital-volume in the media stream. The source of the media stream may be one of the HDMI appliances, such as a set-top-box, a DVD player, etc. At a step 710, the source of the media stream is configured to decode the media stream, raise the embedded-digital volume, and then encode the media stream with the raised embedded-digital volume. Raising the embedded-digital volume of a media stream is also referred to in the art as reducing the attenuation of the media stream. At a step 720, the source is then configured to transmit the media stream to another appliance, such as the multi-media gateway, the HDMI display, etc. If the multi-media gateway receives the media stream from the source, the multi-media gateway may transfer the media stream to the HDMI display or the like for play thereon, step 730.

The input received by the remote-control engine may be for raising the embedded-digital volume to the embedded-digital volume maximum or may be for raising the embedded-digital volume to less than the embedded-digital volume maximum. If the embedded-digital volume is raised to the embedded-digital volume maximum, the remote-control engine (e.g., operating on the multi-media gateway) is configured to direct the sound system to raise the analog volume for subsequent inputs received (e.g., via the remote-control device) for raising the volume of the sound system. Raising the embedded-digital volume before raising the analog volume provides that the signal to noise ratio for the audio signal output by the sound system is kept relatively low. The embedded-digital volume ideally should not introduce any noise, while the analog volume raises both the desired audio and the noise.

If the embedded-digital volume is not raised to the embedded-digital volume maximum based on the received input for raising the volume level, the remote-control engine for subsequent received inputs for raising the volume level is configured to direct the source to raise the embedded-digital volume until the embedded-digital volume is at the embedded-digital volume maximum. If the embedded-digital volume is raised to the embedded-digital volume maximum, the remote-control engine is configured to direct the sound system to raise the analog volume for subsequent inputs received for raising the volume of the sound system.

According to an alternative embodiment, the remote-control engine (based on the received input for raising the volume) may direct the multi-media gateway to increase the embedded-digital volume of the media stream, if, for example, the source of the media stream providing the media stream to the multi-media gateway is not configured to raise the embedded-digital volume of the media stream. The remote-control engine may be operating on the multi-media gateway to control the multi-media gateway to raise the embedded digital volume. According to one embodiment, the remote-control engine operating on the multi-media gateway may be configured to raise the embedded-digital volume.

According to another alternative embodiment, the display (e.g., the HDMI display) is configured to raise the embedded-digital volume of a media stream if the display receives an input for raising the volume. The display may be configured to raise the embedded digital volume to a maximum volume level as described above prior to raising the analog volume.

According to one embodiment, the multi-media gateway may know that the source is configured to raise the embedded-digital volume, and therefore control the source to raise the embedded-digital volume as described above. The multi-media gateway may determine the specific sources (e.g., the set-top-box) that are configured to raise the embedded-digital volume during setup of the multi-media gateway from a user, computer 122, remote server 125, etc. Alternatively, the multi-media gateway may be configured to query a source to determine whether the source is configured to raise an embedded-digital volume of a media stream.

According to a further embodiment, if the remote-control engine receives an input (e.g., via the remote-control device) for lowering the volume of the sound system, the remote-control engine is configured to direct the sound system to lower the analog volume. For example, the multi-media gateway may direct the display (e.g., the HDMI display to lower the analog volume).

According to one alternative embodiment, if the remote-control engine receives an input for lowering the volume level of the sound system, the remote control is configured to direct the sound system to lower the analog volume if the analog volume is greater than a threshold-analog-volume level (e.g., 80% of the maximum analog-volume level). If the analog volume of the sound system is equal to or less than the threshold-analog-volume level, then the remote-control engine is configured to direct the source to lower the embedded-digital volume.

For example, if a DVD player is the source of the media stream, the remote-control engine is configured to direct the DVD player to raise the embedded-digital volume in the media stream for received inputs for raising the volume until the embedded-digital volume is at the embedded-digital volume maximum. More specifically, the DVD player is configured to decode the media stream from a DVD, raise the embedded-digital volume, and then encode the media stream with the raised embedded-digital volume. The DVD player is then configured to transmit the media stream to the multi-media gateway, and the multi-media gateway is configured to transmit the media stream to an appliance (e.g., the HDMI display) configured to play the media stream. After the embedded-digital volume is at the embedded-digital volume maximum, the remote-control engine is configured to direct the appliance (e.g., the HDMI display) to raise the analog-volume level.

According to one embodiment, the remote-control device is configured to send command codes to the multi-media gateway (e.g., acting as a bridge) for raising and lowering the embedded-digital volume and the analog volume as described above. According to further embodiment, one of the HDMI appliances (e.g., the HDMI display) may be configured to operate a remote-control engine configured to perform the foregoing described volume control steps. For example, the HDMI display may be receive a button press or the like for raising or lowering the volume of the sound system of the HDMI display. The HDMI display may send command codes to a source (e.g., a DVD player) to raise the embedded-digital volume until the embedded-digital volume is at the embedded-digital volume maximum, and thereafter the HDMI display will raise its analog volume for received inputs for raising the volume.

According to one embodiment, the embedded-digital volume may be controlled in multiple devices. For example, a first appliance (e.g., a first HDMI appliance, such as a DVD player, a set-top-box, etc.) may be a source for a media stream, which is transmitted from the first appliance to the multi-media gateway (or more generally a pass-through device) and then transmitted from the multi-media gateway to a second appliance (e.g., a second HDMI appliance, such as the HDMI display and/or sound system) configured to play the media stream.

The first appliance and the multi-media gateway may both be configured to raise the embedded-digital volume of the media stream, and the second appliance may be configured to raise the analog volume for the media stream when the media stream is played. According to one embodiment, in response to an input for raising the volume output from the second appliance the embedded-digital volume may first be raised by the first appliance to a first embedded-digital volume maximum, and then may be raised by the multi-media gateway to a second embedded-digital volume maximum. That is, the first appliance is configured to decode the media stream, raise the embedded-digital volume, and then encode the media stream. The multi-media gateway may be configured to perform that same encoding and decoding. The multi-media gateway during decoding may be configured to determine whether the embedded-digital volume of the media stream received from the first appliance is at the embedded-digital volume maximum, and raise the embedded-digital volume if the embedded-digital volume is less than the embedded-digital volume maximum. Otherwise, if the embedded-digital volume is at the embedded-digital volume maximum, the multi-media gateway may be configured to direct the second appliance to raise the analog volume. The embedded-digital volume and the analog volume may be controlled via the remote-control engine operating on the remote control device or the multi-media gateway after receiving an input to raise the volume. According to a further embodiment, the volume output by an appliance may be lowered by first lowering the analog volume of the appliance to a first volume threshold level, and thereafter lowering the embedded-digital volume first in the multi-media gateway to a first digital-volume threshold level and then lowering the embedded-digital volume in the first appliance.

According to one embodiment, the multi-media gateway is configured to receive two media streams from two sources, such as HDMI sources. Each media stream includes an audio track. The multi-media gateway may be configured to equalize the embedded-digital volumes of the two media streams. For example, the multi-media gateway may be configured to equalize the embedded-digital volume of a latter received media stream received from a first source to the same level as the embedded-digital volume of a previous received media stream received from a second source. Equalizing the embedded-digital volumes of the two media streams provides that that volume output from an appliance playing the two received media stream will be approximately the same. Equalizing the embedded-digital volumes of the two media streams as described provides that if the input for the source is changed from the second source to the first source the volume output from the appliance playing the sources will not be so loud so as to be uncomfortable, or so low as to be not understandable. For example, the embedded-digital volume of the first media stream may be higher than the embedded-digital volume of the second media stream, and the multi-media gateway may lower the embedded-digital volume of the first media stream to the same level as the embedded-digital volume of the second media stream so that the volume output by the appliance playing the media steam is not so high as to be uncomfortable. Alternatively, the embedded-digital volume of the first media stream may be lower than the embedded-digital volume of the second media stream, and the multi-media gateway may raise the embedded-digital volume of the first media stream to the same level as the embedded-digital volume of the second media stream is not so low as to not be understandable. The multi-media gateway may be configured to store in a local memory the embedded-digital volume of a previously received media stream and raise or lower the embedded-digital volume based on the stored embedded-digital volume.

It is to be understood that the examples and embodiments described above are for illustrative purposes only and that various modifications or changes in light thereof will be suggested to persons skilled in the art, and are to be included within the spirit and purview of this application and scope of the appended claims. For example, the different steps described above for the various embodiments are not limited to the embodiments in the context in which they have been specifically described and may have broader application. For example, in one embodiment, the failed command codes identified during the operation of the remote control engine may be used to further expand the remote database of command codes.

According to a further example, while the remote-control engine is described herein as being computer code operable on a processor, the remote-control engine may be a circuit, such as an application specific circuit, firmware, or a combination of one or more of software, firmware, and circuits. According to another example, while the application describes several embodiments related to i) linking sets of CEC command codes to EDIDs and CEC vendor IDs, ii) building CEC command code databases, iii) determining CEC command code failures and action taken in view thereof (e.g., determining substitute command codes therefore, building a CEC command code database, etc.), the embodiments described herein are not so limited. Specifically, embodiments that are described with respect to sets of CEC command codes may be equally applied to other sets of command codes, such as set of IR command code, set of RF command codes, etc. For example, the embodiment described herein may be applied to linking EDIDs to IR command codes, linking CEC vendor IDs to IR command codes, determining whether IR command codes fail and determining alternative command codes therefore. Various embodiment of the present invention may be operable with bi-directional and two-way wired and wireless protocols (e.g., IP, RF, such as BT, etc.) over a standard medium or an open medium. Therefore, the above description should not be understood as limiting the scope of the invention as defined by the claims.

What is claimed is:

1. A method for configuring a remote-control system comprising:
   querying via a bus a High Definition Multi-Media Interface (HDMI) display for an Extended Display Identification Data (EDID) for the HDMI display;
   receiving via the bus from the HDMI display the EDID for the HDMI display; and
   storing via a processor in a memory the EDID and a link between the EDID of the HDMI display and a set of command codes configured for controlling the HDMI display.

2. The method of claim 1, wherein the set of command codes is a set of IR command codes.

3. The method of claim 1, wherein the set of command codes is a set of CEC command codes.

4. The method of claim 1, further comprising storing via a processor in the memory another link between the EDID of the HDMI display and a model number for the HDMI display.

5. The method of claim 4, further comprising determining the model number from an inference from operation of a remote-control device, from querying a user of the remote-control device, or from downloading to the remote-control system the model number from a remote database.

6. The method of claim 1, further comprising storing via a processor in a database another link between the EDID of the HDMI display and a make of the HDMI display.

7. The method of claim 1, wherein the memory is a local memory of the remote-control system.

8. The method of claim 1, wherein the memory is a remote database.

9. A method for operating a remote-control system comprising:
   querying via a bus a set of High Definition Multi-Media Interface (HDMI) appliances for a set of Consumer Electronic Control (CEC) identifiers, wherein the HDMI appliances of the set of HDMI appliances are respectively associated with the CEC vendor identifiers of the set of CEC vendor identifiers;
   receiving via the bus from the set of HDMI appliances the set of CEC vendor identifiers; and
   storing via a processor in a memory the set of CEC vendor identifiers, and a set of links that respectively link in the memory the CEC vendor identifiers in the set of CEC vendor identifiers with sets of command codes for the set of HDMI appliances.

10. The method of claim 9, further comprising storing via a processor in the memory another set of links respectively linking the CEC vendor identifiers of the set of CEC vendor identifiers and make identifiers of a set of make identifiers, which identify the HDMI appliances in set of HDMI appliances.

11. The method of claim 9, further comprising storing via a processor in the memory another set of links between the CEC vendor identifiers of the set of CEC vendor identifiers and model numbers of a set of model number for the HDMI appliances in the set of HDMI appliances.

12. A method for building a database of command codes comprising:
    monitoring a CEC bus for a set of CEC command codes transmitted over the CEC bus;
    comparing the set of CEC command codes transmitted over the CEC bus with sets of known CEC command codes for an HDMI appliances that received the set of CEC command codes;
    identifying a subset of CEC command codes, which are included in the set of CEC command codes and which are not in the sets of known CEC command codes; and
    storing the subset of CEC command codes in memory as unrecognized.

13. The method of claim 12, further comprising transferring the subset of CEC command codes to a remote database to query the remote database whether the CEC command codes in the subset of CEC command codes are stored in the remote database as recognized.

14. The method of claim 13, further comprising transferring function information for the subset of CEC command codes to a remote-control for use thereby, if the subset of CEC command codes are included in a set of known CEC command codes stored in the remote database.

15. The method of claim 13, further comprising analyzing the subset of CEC command codes to determine the functions of the subset of CEC command codes, if the subset of CEC command codes are not included in a set of known CEC command codes stored in the remote database.

16. A non-transitory computer-readable storage medium having stored thereon instructions that, when executed by one or more processors of a system, cause the system to:
    query via a bus a High Definition Multi-Media Interface (HDMI) display for an Extended Display Identification Data (EDID) for the HDMI display;
    receive via the bus from the HDMI display the EDID for the HDMI display; and
    store via a processor in a memory the EDID and a link between the EDID of the HDMI display and a set of command codes configured for controlling the HDMI display.

17. The computer-readable storage medium of claim 16, wherein the set of command codes includes at least one of IR command codes and CEC command codes.

18. The computer-readable storage medium of claim 16, further comprising storing another link between the EDID of the HDMI display and a model number for the HDMI display.

19. The computer-readable storage medium of claim 16, further comprising determining the model number by: inferring a model number from operation of a remote-control device, querying a user of the remote-control device; or downloading the model number to the remote-control system from a remote database.

20. The computer-readable storage medium of claim 16, wherein the memory is a local memory of the remote-control system.

21. A non-transitory computer-readable storage medium having stored thereon instructions that, when executed by one or more processors of a system, cause the system to:
    monitor a CEC bus for a set of CEC command codes transmitted over the CEC bus;
    compare the set of CEC command codes transmitted over the CEC bus with sets of known CEC command codes for an HDMI appliances that received the set of CEC command codes;
    identify a subset of CEC command codes, which are included in the set of CEC command codes and which are not in the sets of known CEC command codes; and
    store the subset of CEC command codes in memory as unrecognized.

22. The computer-readable storage medium of claim 21, wherein the instructions are further configured to cause the system to transfer the subset of CEC command codes to a remote database to query the remote database whether the CEC command codes in the subset of CEC command codes are stored in the remote database as recognized.

23. The computer-readable storage medium of claim 21, wherein the instructions are further configured to cause the system to further comprising analyzing the subset of CEC command codes to determine the functions of the subset of CEC command codes, if the subset of CEC command codes are not included in a set of known CEC command codes stored in the remote database.

* * * * *